United States Patent
Yee et al.

(10) Patent No.: US 11,496,293 B2
(45) Date of Patent: Nov. 8, 2022

(54) SERVICE-TO-SERVICE STRONG AUTHENTICATION

(71) Applicant: Klarna Bank AB, Stockholm (SE)

(72) Inventors: Michael Nicholas Yee, Stockholm (SE); Michael James Duminy, Stockholm (SE); Thim Georg Lohse, Stockholm (SE)

(73) Assignee: Klarna Bank AB, Stockholm (SE)

( * ) Notice: Subject to any disclaimer, the term of this patent is extended or adjusted under 35 U.S.C. 154(b) by 0 days.

(21) Appl. No.: 16/837,956

(22) Filed: Apr. 1, 2020

(65) Prior Publication Data
US 2021/0314149 A1    Oct. 7, 2021

(51) Int. Cl.
*H04L 9/08* (2006.01)
*H04L 9/32* (2006.01)
(Continued)

(52) U.S. Cl.
CPC .......... *H04L 9/0825* (2013.01); *H04L 9/3236* (2013.01); *H04L 9/3247* (2013.01);
(Continued)

(58) Field of Classification Search
CPC ... H04L 9/0825; H04L 9/3236; H04L 9/3247; H04L 63/0823; H04L 67/16; H04L 2463/082
See application file for complete search history.

(56) References Cited

U.S. PATENT DOCUMENTS

| | | | |
|---|---|---|---|
| 6,073,163 A | 6/2000 | Clark et al. | |
| 6,346,953 B1 | 2/2002 | Erlikh et al. | |

(Continued)

FOREIGN PATENT DOCUMENTS

| | | | | |
|---|---|---|---|---|
| CN | 105955889 A | 9/2016 | | |
| WO | WO-2014204862 A1 * | 12/2014 | ............... | H04L 9/14 |

(Continued)

OTHER PUBLICATIONS

Amazon Web Services, "AWS KMS keys concepts," AWS Key Management Service Developer Guide, first disclosed Nov. 12, 2014, latest update Aug. 30, 2021, https://docs.aws.amazon.com/kms/latest/developerguide/concepts.html, 21 pages.

(Continued)

*Primary Examiner* — Wasika Nipa
*Assistant Examiner* — Mayasa A. Shaawat
(74) *Attorney, Agent, or Firm* — Davis Wright Tremaine LLP

(57) ABSTRACT

A request is received from a computing device for substitute data, with access to the substitute data being contingent upon successful multi-factor authentication of the first service. Signature data based on the request is generated using a first key of public-private key pair. Credential proof and the signature is provided to a second service, which verifies the credential proof as a first factor of the multi-factor authentication and verifies, using a second key, the signature as a second factor of the multi-factor authentication. The substitute data is obtained as a result of authentication by the second service. The computing device is caused, by providing the substitute data to the computing device, to input the substitute data into the interface in place of data associated with the first entity.

20 Claims, 10 Drawing Sheets

(51) Int. Cl.
  *H04L 9/40* (2022.01)
  *H04L 67/51* (2022.01)
(52) U.S. Cl.
  CPC .......... *H04L 63/0823* (2013.01); *H04L 67/51* (2022.05); *H04L 2463/082* (2013.01)

(56) References Cited

U.S. PATENT DOCUMENTS

| | | | |
|---|---|---|---|
| 7,788,590 | B2 | 8/2010 | Taboada et al. |
| 8,775,923 | B1 | 7/2014 | Kroeger et al. |
| 8,812,546 | B1 | 8/2014 | Cornali |
| 9,252,962 | B1 | 2/2016 | Valeti |
| 9,753,898 | B1 | 9/2017 | Glommen et al. |
| 9,836,781 | B2 | 12/2017 | Potucek et al. |
| 9,946,895 | B1 | 4/2018 | Kruse et al. |
| 9,959,027 | B1 | 5/2018 | Gajulapally et al. |
| 10,043,255 | B1 | 8/2018 | Pathapati et al. |
| 10,121,176 | B2 | 11/2018 | Buezas et al. |
| 10,649,864 | B1 | 5/2020 | Parikh et al. |
| 10,748,035 | B2 | 8/2020 | Lee |
| 10,816,978 | B1 | 10/2020 | Schwalb |
| 2002/0063734 | A1 | 5/2002 | Khalfay et al. |
| 2004/0216044 | A1 | 10/2004 | Martin et al. |
| 2006/0101392 | A1 | 5/2006 | Isaza |
| 2007/0300145 | A1 | 12/2007 | Perelman et al. |
| 2009/0193250 | A1 | 7/2009 | Yokota et al. |
| 2009/0319342 | A1 | 12/2009 | Shilman et al. |
| 2010/0175050 | A1 | 7/2010 | Wang et al. |
| 2010/0191582 | A1 | 7/2010 | Dicker et al. |
| 2010/0306249 | A1 | 12/2010 | Hill et al. |
| 2011/0106732 | A1 | 5/2011 | Chidlovskii |
| 2011/0126158 | A1 | 5/2011 | Fogarty et al. |
| 2011/0289489 | A1 | 11/2011 | Kumar et al. |
| 2011/0302487 | A1 | 12/2011 | McCormack et al. |
| 2012/0174069 | A1 | 7/2012 | Zavatone |
| 2013/0095864 | A1 | 4/2013 | Marovets |
| 2014/0173415 | A1 | 6/2014 | Kattil Cherian et al. |
| 2014/0372867 | A1 | 12/2014 | Tidhar et al. |
| 2015/0082280 | A1 | 3/2015 | Betak et al. |
| 2015/0264107 | A1 | 9/2015 | Harz et al. |
| 2016/0065370 | A1* | 3/2016 | Le Saint ............... H04L 63/061 713/155 |
| 2016/0080157 | A1* | 3/2016 | Lundstrom ........... H04L 9/3247 713/176 |
| 2016/0328984 | A1 | 11/2016 | Ben-Naim |
| 2016/0379220 | A1* | 12/2016 | Tunnell ............... H04L 63/0869 705/71 |
| 2017/0038846 | A1 | 2/2017 | Minnen et al. |
| 2017/0090690 | A1 | 3/2017 | Chor |
| 2017/0124053 | A1 | 5/2017 | Campbell et al. |
| 2017/0161822 | A1 | 6/2017 | Crogan et al. |
| 2017/0168996 | A1 | 6/2017 | Dou et al. |
| 2017/0337116 | A1 | 11/2017 | Negara et al. |
| 2017/0372408 | A1 | 12/2017 | Khandelwal et al. |
| 2018/0024915 | A1 | 1/2018 | Taneja |
| 2018/0174212 | A1 | 6/2018 | Lauka et al. |
| 2018/0335939 | A1 | 11/2018 | Karunamuni et al. |
| 2018/0336574 | A1 | 11/2018 | Mohan et al. |
| 2018/0350144 | A1 | 12/2018 | Rathod |
| 2019/0007508 | A1 | 1/2019 | Ku et al. |
| 2019/0114059 | A1 | 4/2019 | Chakra et al. |
| 2019/0114061 | A1 | 4/2019 | Daniels et al. |
| 2019/0158994 | A1 | 5/2019 | Gross et al. |
| 2019/0205773 | A1 | 7/2019 | Ackerman et al. |
| 2019/0259293 | A1 | 8/2019 | Hellman et al. |
| 2019/0294642 | A1 | 9/2019 | Matlick et al. |
| 2019/0384699 | A1 | 12/2019 | Arbon et al. |
| 2020/0007487 | A1 | 1/2020 | Chao et al. |
| 2020/0089813 | A1 | 3/2020 | Chauhan |
| 2020/0089912 | A1 | 3/2020 | Mital et al. |
| 2020/0125635 | A1 | 4/2020 | Nuolf et al. |
| 2020/0134388 | A1 | 4/2020 | Rohde |
| 2020/0201689 | A1 | 6/2020 | Laethem |
| 2020/0306959 | A1 | 10/2020 | Huang et al. |
| 2020/0394396 | A1 | 12/2020 | Yanamandra et al. |
| 2020/0409668 | A1 | 12/2020 | Eberlein et al. |
| 2020/0410062 | A1 | 12/2020 | O'Malley |
| 2020/0410063 | A1 | 12/2020 | O'Malley |
| 2021/0090449 | A1 | 3/2021 | Smith et al. |

FOREIGN PATENT DOCUMENTS

| | | | | |
|---|---|---|---|---|
| WO | 2018053863 | A1 | 3/2018 | |
| WO | WO-2019171163 | A1 * | 9/2019 | ......... G06Q 20/4014 |
| WO | 2020069387 | A1 | 4/2020 | |

OTHER PUBLICATIONS

Gur et al., "Adversarial Environment Generation for Learning to Navigate the Web," Deep RL Workshop, NeurIPS 2020, Mar. 2, 2021, 14 pages.
Gur et al., "Learning to Navigate the Web," International Conference on Learning Representations (ICLR) 2019, Dec. 21, 2018, 12 pages.
Hou et al., "Malicious web content detection by machine learning," Expert Systems With Applications 37(1):55-60, Jan. 1, 2010.
International Search Report and Written Opinion dated Apr. 6, 2021, Patent Application No. PCT/IB2021/050169, 15 pages.
International Search Report and Written Opinion dated Feb. 16, 2021, Patent Application No. PCT/IB2020/060585, 16 pages.
International Search Report and Written Opinion dated Jun. 9, 2021, Patent Application No. PCT/IB2021/052415, 15 pages.
International Search Report and Written Opinion dated May 25, 2021, Patent Application No. PCT/IB2021/051913, 13 pages.
Memon et al., "GUI Ripping: Reverse Engineering of Graphical User Interfaces for Testing," Proceedings of the 10th Working Conference on Reverse Engineering (WCRE '03), Nov. 2003, 10 pages.
Wikipedia, "k-means clustering," Wikipedia the Free Encyclopedia, last edited Jun. 25, 2020 (retrieved Jul. 9, 2020), https://en.wikipedia.org/wiki/k-means_clustering, 16 pages.
Wikipedia, "MHTML," Wikipedia the Free Encyclopedia, last edited Apr. 29, 2021, https://en.wikipedia.org/wiki/MHTML, 6 pages.
Wikipedia, "X.509," Wikipedia Encyclopedia, Aug. 16, 2018, retrieved May 13, 2020, from https://web.archive.org/web/20180816222554/https://en.wikipedia.org/wiki/X.509, 16 pages.
U.S. Appl. No. 16/680,392, filed Nov. 11, 2019.
U.S. Appl. No. 16/680,396, filed Nov. 11, 2019.
U.S. Appl. No. 16/680,403, filed Nov. 11, 2019.
U.S. Appl. No. 16/680,406, filed Nov. 11, 2019.
U.S. Appl. No. 16/680,408, filed Nov. 11, 2019.
U.S. Appl. No. 16/680,410, filed Nov. 11, 2019.
U.S. Appl. No. 16/744,017, filed Jan. 15, 2020.
U.S. Appl. No. 16/813,531, filed Mar. 9, 2020.
U.S. Appl. No. 16/744,021, filed Jan. 15, 2020.

* cited by examiner

SERVICE-TO-SERVICE STRONG AUTHENTICATION

BACKGROUND

In modern computer systems, successful multi-factor authentication may be required for access to sensitive data. Multi-factor authentication, while more secure than single-factor authentication, can have the disadvantages of being burdensome on users and one or more factors can be misplaced, forgotten, stolen, damaged, or otherwise unavailable at the moment they are needed. In some cases, sensitive data may be needed in order to utilize certain features of a service. Complicating this aim, however, is that there may be numerous manual authentication processes between various services that may be required to obtain the data. Dynamically implementing the appropriate authentication processes between services to obtain sensitive data without hampering the user's experience can be complex and challenging.

BRIEF DESCRIPTION OF THE DRAWINGS

Various techniques will be described with reference to the drawings, in which.

DETAILED DESCRIPTION

Figure 1:
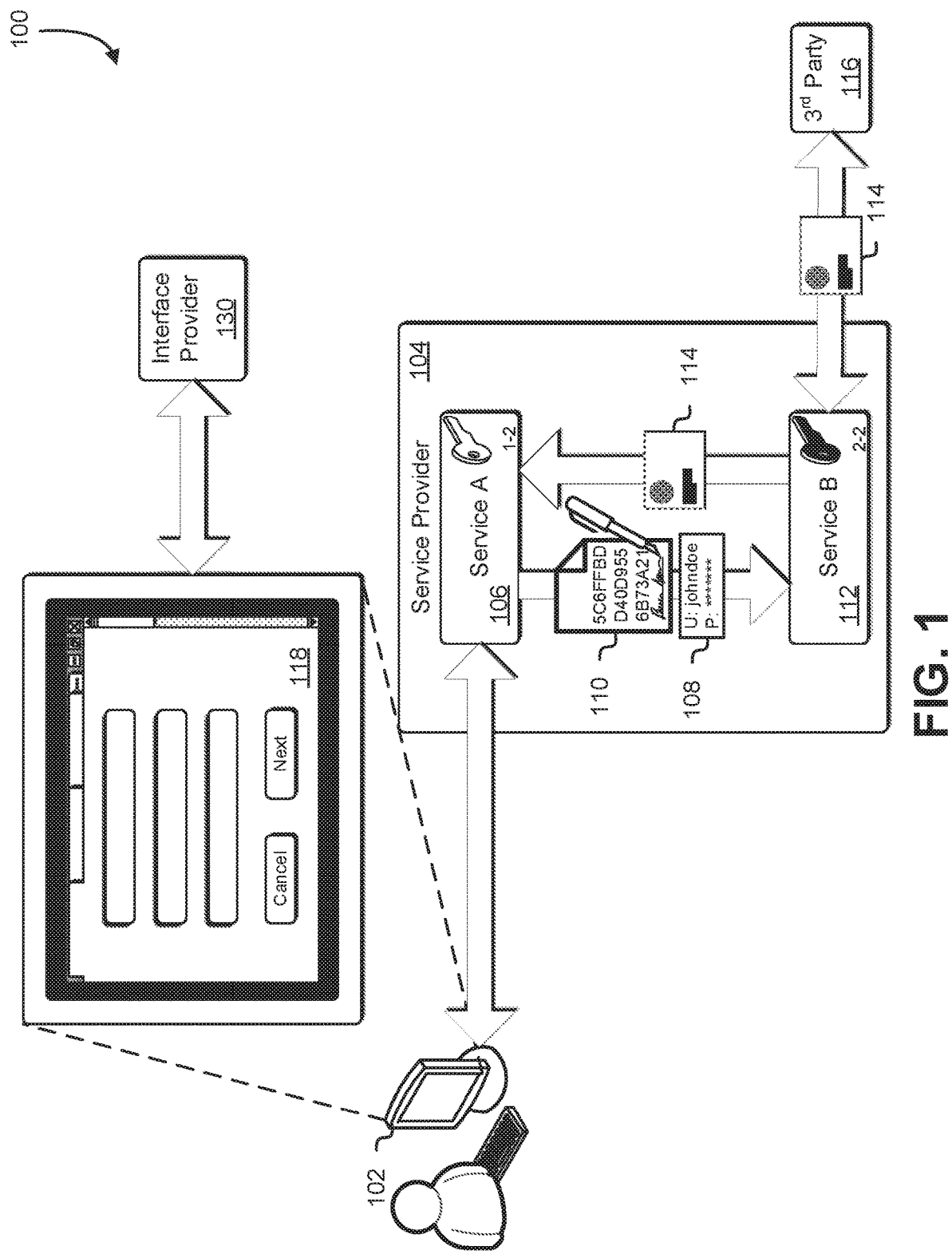
FIG. 1 illustrates an example of service-to-service multi-factor authentication in accordance with an embodiment.

Techniques and systems described below relate to multi-factor authentication of a first service to grant access to data. In one example, a first service of a service provider receives a request from a client device for substitute sensitive data of the service provider. The request may include a set of attributes, some of which may indicate at least a first entity associated with the client device and a second entity associated with an interface displayed by the client device. For example, the first entity may be any entity operable to access and utilize the client device, and the second entity may be a service provider that provides the interface which may be displayed and accessed by the client device. In some examples, the set of attributes may also include various attributes of the substitute sensitive data (e.g., the type of substitute sensitive data required, etc.), the first entity (e.g., a location or region of the first entity, etc.), and the second entity (e.g., a location or region of the second entity, an identifier of the second entity, etc.), and/or variations thereof. The set of attributes may also include values associated with one or more items displayed in the interface.

The first entity, through the client device, may seek to utilize the interface to access various services of the second entity. The interface may be provided by the second entity and may require sensitive data. The second entity may provide various services, in which access to the services may require sensitive data. In some examples, the second entity may provide access to the services in response to sensitive data being input to the interface. The first entity may seek to obtain and input substitute sensitive data to the interface in place of sensitive data associated with the client device and the first entity. The first entity, through the client device, may seek to utilize the substitute sensitive data to access the services of the second entity through the interface. In various embodiments, granting of access to the substitute sensitive data may be contingent upon successful multi-factor authentication of the first service.

In some examples, the first service may use a private key of an asymmetric key pair to generate a digital signature based on the set of attributes included in the request. The asymmetric key pair may comprise at least the private key and a corresponding public key. In some examples, a key may refer to a cryptographic key that is utilized in the performance of various cryptographic operations. In various embodiments, the first service may have access to the private key and a second service of the service provider lacks access to the private key; the second service, however, may have access to the public key, and, in some embodiments, the first service may have access to the private key but lack access to the public key. The first service may utilize the private key and the set of attributes with various cryptographic algorithms, cryptographic ciphers, and/or variations thereof, to generate the digital signature. The first service may generate the digital signature by generating a hash of the set of attributes and/or encrypting the set of attributes.

The first service may then provide proof of credentials associated with the first service and the digital signature to the second service. The proof of credentials may include credential information that may be associated with the first service. The proof of credentials may include representations of credential information (e.g., a hash of a password) that may be utilized to authenticate and authenticate the identity of the first service. The second service may perform the multi-factor authentication of the first service. The second service may authenticate the proof of credentials as a first factor of the multi-factor authentication. The second service may compare the proof of credentials with known credentials of the first service to authenticate the proof of credentials. The second service may, utilizing the proof of credentials, authenticate the identity of the first service.

The second service may then authenticate, using the public key of the asymmetric key pair, the digital signature as a second factor of the multi-factor authentication. As noted, in various embodiments, the first service has access to the private key, and the second service has access to the public key; the private key and the public key may be stored in a database utilizing various access policies. The second service may authenticate the digital signature by at least authenticating the digital signature with the public key. In some examples, the digital signature may be generated by the first service by generating a first hash of data that includes the set of attributes using a predetermined hash function, encrypting the first hash with the private key, and sending the data and encrypted first hash to the second service; the second service may then authenticate the digital signature by at least decrypting the encrypted first hash with the public key, generating a second hash of the data using the predetermined hash function, and confirming that the first and second hashes match.

The second service may, upon successful multi-factor authentication of the first service, grant access to the substitute sensitive data. The second service may obtain the substitute sensitive data from another service, such as a third party service external to the computing environment of the first and second services. The second service may cause the substitute sensitive data to be provided to the client device through the first service. In various embodiments, metadata is stored in a data store that associates the substitute sensitive data with the first entity and the second entity. The metadata may indicate that the substitute sensitive data has been provided to the client device to be utilized by the first entity with the second entity. Upon receipt of the substitute sensitive data, the client device may enter the substitute sensitive data into the interface in place of (e.g., as a substitute for) sensitive data associated with the first entity which may cause, by submission of the substitute sensitive data to the second entity, the second entity to perform an operation using the substitute sensitive data. In various embodiments, the client device enters the substitute sensitive data into the interface to cause the interface to allow the client device and the first entity to access the services of the second entity. In various examples, the substitute sensitive data may only be utilized once; upon the utilization of the substitute sensitive data, the substitute sensitive data may be invalidated through one or more processes of the service provider. In some examples, the substitute sensitive data may be associated with an expiration time such that the substitute sensitive data may only be usable until the expiration time.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

Techniques described and suggested in the present disclosure improve the field of computing, especially the field of computer security, by use of an efficient system that implements secure multi-factor authentication between two different computing services before sensitive information is transferred between the services. Additionally, techniques described and suggested in the present disclosure improve the efficiency of user interfaces by dynamically performing multi-factor authentication between computing systems, thereby obviating the necessity to involve a user in the multi-factor authentication process via a user interface. Moreover, techniques described and suggested in the present disclosure are necessarily rooted in computer technology in order to overcome problems specifically arising with users being required to enter personal information via interface forms and then lose control over the use of that information by providing the user with substitute information from the user's service provider.

FIG. 1 illustrates an example 100 of service-to-service multi-factor authentication, according to various embodiments. As illustrated in FIG. 1, the example 100 may include a client device 102 which may interact with a service provider 104 that may comprise a service A 106, which may utilize credential proof 108 and a digital signature 110, and a service B 112. The service provider 104 may obtain substitute sensitive data 114 from a third party 116. The client device 102 may also interact with an interface 118 which may be provided by an interface provider 130. In various embodiments, the client device 102 utilizes the service provider 104 to obtain the substitute sensitive data 114 which may be utilized in the interface 118 provided by the interface provider 130.

The client device 102 may be any entity operable to access various systems and/or services such as the interface provider 130 and the service provider 104. In some examples, the client device 102 may be a computing device such as one or more instances of a physical computing instance (e.g., a physical server computer, a mobile communication device, a laptop computer, a tablet computer, a personal computer, a mainframe, etc.) or one or more instances of a virtual computing instance, such as a virtual machine hosted on one or more computer servers, or other computing system capable of communicating with various systems and/or services. For example, the client device 102 may be similar to the computing device 1000 of FIG. 10. The client device 102 may access the interface 118 which may be provided by the interface provider 130. In some examples, the interface 118 may be a webpage that is accessible through the Internet and identified with one or more uniform resource identifiers (URIs).

The interface provider 130 may be a service provider that may provide various services that can be requested through the interface 118. Such services may include a service for requesting utilitarian and/or other material items of interest of a user and/or services such as data processing, data storage, software applications, security, encryption, library services, utility services, television services, entertainment services, and/or other such services. The interface provider 130 may provide a set of interfaces that may be utilized to access the services provided by the interface provider 130. The interface provider 130 may host or otherwise provide the interface 118. The interface 118 may be utilized by one or more entities to interact with the interface provider 130. In some examples, the interface 118 may require input from one or more entities to allow the one or more entities to access the services of the interface provider 130. Additionally, in various embodiments, the interface 118 requires entry of sensitive data from the one or more entities. The client device 102 may be required to input sensitive data into the interface 118 to access the services of the interface provider 130.

The user of the client device 102 may seek to access the services of the interface provider 130 without providing sensitive data specific to the user of the client device 102 to the interface 118. The client device 102 may utilize the service provider 104 to obtain the substitute sensitive data 114 that may be used in place of sensitive data specific to the client device 102 in the interface 118. In various examples, the substitute sensitive data 114 may be referred to as substitute data, sensitive data, data, and/or variations thereof.

The service provider 104 may be a service configured to provide substitute sensitive data in response to requests. In some examples, the service provider 104 may be implemented as a software application or service executing on at least one computing device, such as the computing device 1000 of FIG. 10. Examples of such a computing device include one or more instances of a physical computing instance (e.g., a physical server computer, a mobile communication device, a laptop computer, a tablet computer, a personal computer, a mainframe, etc.) or one or more instances of a virtual computing instance, such as a virtual machine hosted on one or more computer servers, or other computing system capable of communicating with various systems and/or services.

In some examples, the service A 106 may be an intermediary service that facilitates communication between the client device 102 and various other services of the service provider 104, such as the service B 112. In embodiments of the present disclosure, in order to obtain substitute sensitive data for the user of the client device 102, the service A 106 is multi-factor authenticated by the service B 112. In various embodiments, the service A 106 and the service B 112 is associated with an asymmetric cryptographic scheme, in which the service A 106 may have access to a private cryptographic key that may be utilized for encryption, and the service B 112 may have access to a public cryptographic key that may be utilized for decryption of data objects encrypted by the private cryptographic key. The cryptographic keys may be generated and stored in a data storage service (not shown) beforehand, and respectively fetched by the service A 106 and the service B 112 upon start of the service A 106 and the service B 112. Further information regarding the cryptographic keys can be found in the description of FIG. 2. Additionally, the service A 106 and the service B 112 may be associated with various credentials that may authenticate the services (e.g., the service A 106 may be associated with credentials (e.g., a username and a password) that may authenticate the service A 106, and the service B 112 may be associated with different credentials (e.g., a different username and a different password) that may authenticate the service B 112). In some examples, the service A 106 may be associated with the credential proof 108 that may authenticate or otherwise authenticate the identity of the service A 106.

In an embodiment, the client device 102 (e.g., via an application executing on the client device 102) submits a request to the service A 106 for substitute sensitive data. In some embodiments, the client device 102 submits the request via one or more interfaces and applications provided by the service provider 104. The service A 106 may be a component of the service provider 104 that may, upon authentication of the service A 106, provide substitute sensitive data in response to requests for substitute sensitive data. In some examples, the request may be an application programming interface (API) request. The request may include information indicating one or more attributes and characteristics regarding the interface 118 and/or other information, such as the type of substitute sensitive data required (e.g., credential information, personal information, and the like), a classification of the interface 118, information regarding the interface provider 130 (e.g., a name of the interface provider 130, a location or region of the interface provider 130, and the like), and/or variations thereof. For example, the request may indicate that the client device 102 may require sensitive data in the form of credential information.

In embodiments, the service A 106 receives the request and generates a hash from the request utilizing a particular hash function. In some examples, the service A 106 may utilize a hash function such as one or more algorithms of the Secure Hash Algorithms (SHA) and/or variations thereof. In some examples, the term "hash" refers to a cryptographically strong hash such that it may be computationally infeasible to decrypt and/or forge, and of negligible probability that two distinct values can be computed or found such that the hash of one distinct value may equal a hash of another distinct value. The service A 106 may utilize data from the request as the input into the particular hash function. In embodiments, the service A 106 signs the hash with the private cryptographic key that may be accessible by the service A 106 to generate the digital signature 110. In some examples, the service A 106 may sign the hash by encrypting the hash utilizing the private cryptographic key. The service A 106 may then provide the data of the request, the digital signature 110, and the credential proof 108 to the service B 112. In some examples, the credential proof 108 may include a username and a hash of a password associated with the service A 106; the plaintext password may not be provided to the service B 112.

The service B 112 may receive the data of the request, the digital signature 110, and the credential proof 108, and perform various processes to authenticate the service A 106. The service B 112 may first authenticate the credential proof 108. In various embodiments, the service B 112 utilizes compares known credentials (e.g., username and hash of the password) of the service A 106 with the credential proof 108; if the credentials match, the service B 112 may determine that the credential proof 108 provided by the service A 106 is authentic and authenticate the service A 106, and if they do not, the service B 112 may determine that the service A 106 is not authenticated. In some examples, the service B 112 may compute a hash of a known password of the service A 106, and compare the computed hash with the credential proof 108; if the computed hash matches the hash of the password, the service B 112 may determine that the credential proof 108 provided by the service A 106 is authentic and authenticate the service A 106 as having proven knowledge of its password (e.g., a knowledge factor in multi-factor authentication). The service B 112 may then authenticate the digital signature 110.

The service B 112 may utilize the public cryptographic key that may be accessible to the service B 112 to authenticate the digital signature 110. The service B 112 may decrypt the digital signature 110 utilizing the public cryptographic key to obtain the hash generated by the service A 106 from the request. The service B 112 may then generate another hash from the data of the request received from the service A 106. The service B 112 may utilize the same particular hash function utilized by the service A 106 to generate the other hash. The service B 112 may then compare the other hash to the hash generated by the service A 106; if the hashes match, the service B 112 may determine that the digital signature 110 is authentic and authenticate the service A 106. In some examples, the hashes matching may also indicate that the data of the request has not been corrupted at some point between the service A 106 and the service B 112, and may provide verification of integrity of the data of the request. Additionally, the hashes matching may additionally indicate that the service A 106 has possession of the appropriate private cryptographic key (e.g., a possession factor in multi-factor authentication) corresponding to the public cryptographic key accessible to the service B 112. Thus, the service B 112 may authenticate the service A 106 utilizing multiple factors comprising the authentication of the credential proof 108 and authentication of the digital signature 110. The service B 112, following the authentication of the service A 106, may retrieve the substitute sensitive data 114. In some implementations, the service B may place a request for and receive the substitute sensitive data from another service of the service provider 104 or, as illustrated in FIG. 1, the third party 116 (e.g., service that is external to the environment of the service provider 104). In some embodiments, the substitute sensitive data 114 is generated to comply with an arrangement with the third party 116. For example, the third party 116 may generate the substitute sensitive data 114 to contain values (e.g., identification numbers, account numbers, etc.) within a specific range. In some embodiments, the service B 112 may be authorized (e.g., by the third party 116/in agreement with the third party 116) to generate the substitute sensitive data 114 to provide to the service A 106; for example, the service B 112 may be authorized to generate substitute sensitive data 114 in accordance with certain conditions (e.g., identification numbers, account numbers, or other values restricted to being within a designated range). The service provider 104 may additionally generate and store metadata indicating the authentication (e.g., in a log file or other data store). The metadata may indicate that the client device 102 has been granted access to the substitute sensitive data 114 for use within the interface 118 of the interface provider 130.

In some embodiments, the service B 112 authenticates the service A 106, but does not retrieve or provide the substitute sensitive data 114 to the service A 106; rather, authentication of the service A 106 by the service B 112 may allow the service A 106 to obtain the substitute sensitive data 114 from another source (e.g., the third party 116 or other service of the service provider 104). For example, additionally or alternatively, the service B 112 may provide, upon successful authentication, the service A 106 with a token that the service A 106 can present in a request to another entity as proof that the service A 106 has been authenticated and receive the substitute sensitive data 114 in response. As another example, additionally or alternatively, the service B 112 may notify the other entity that the service A 106 has been authenticated, and as a result the other entity may push the substitute sensitive data to the service A 106. It is contemplated that other workflow variations are possible for getting the substitute sensitive data 114 to the service A upon successful authentication.

In various embodiments, the third party 116 is a third party entity, third party service, service provider, interface provider, application, and/or other service not provided by the service provider 104, that may provide sensitive data in response to requests. The service B 112 may submit a request to the third party 116, utilizing some of the data of the request, to obtain the substitute sensitive data 114. For example, the sensitive data may be associated with certain limits on usage of the sensitive data (e.g., one-time use, may be associated with a particular value indicated in the interface 118, etc.), which the third party 116 may associate with the sensitive data the third party 116 provides to the service B 112. The service B 112, which may not be in direct communication with the client device 102, may then provide the substitute sensitive data 114 to the service A 106, which may next provide the substitute sensitive data 114 to the client device 102 in response to the request by the client device 102 for the sensitive data. The client device 102 may utilize (e.g., input) the substitute sensitive data 114 in the interface 118 to access the services of the interface provider 130.

The interface provider 130 may further communicate with the third party 116 and/or the service provider 104 to confirm the validity of the substitute sensitive information. The substitute sensitive data may be associated with an obligation such that receipt of the substitute sensitive information by the interface provider 130 obligates the third party 116 to provide the interface provider 130 with something of value. This obligation may likewise extend to obligate the service provider 104 to provide the third party 116 with something of value, which may also obligate the user of the client device 102 to provide the service provider 104 with something of value as well. In some examples, the substitute sensitive data 114 may be associated with a set of conditions restricting usage of the substitute sensitive data 114, such that an attempt to utilize the substitute sensitive data 114 in a manner noncompliant with the set of conditions (e.g., use in a different session, use in more than a threshold number of submissions, use with a different interface provider, etc.) may cause submission (e.g., to the interface provider 130, to the third party 116, etc.) of the substitute sensitive data 114 to be rejected. For example, the substitute sensitive data 114 may be single-use only such that the substitute sensitive data 114 may be earmarked/allocated for use in a particular submission (e.g., to the interface provider 130) by the client device 102 or for a particular session of the interface 118. In some embodiments, the substitute sensitive data 114 can be reused, but may need to be earmarked/allocated for use in another submission by service A 206 and service B 112 repeating the process with a different digital signature (e.g., data from a second request used in generating the digital signature will be different from the data in the first request).

Figure 2:
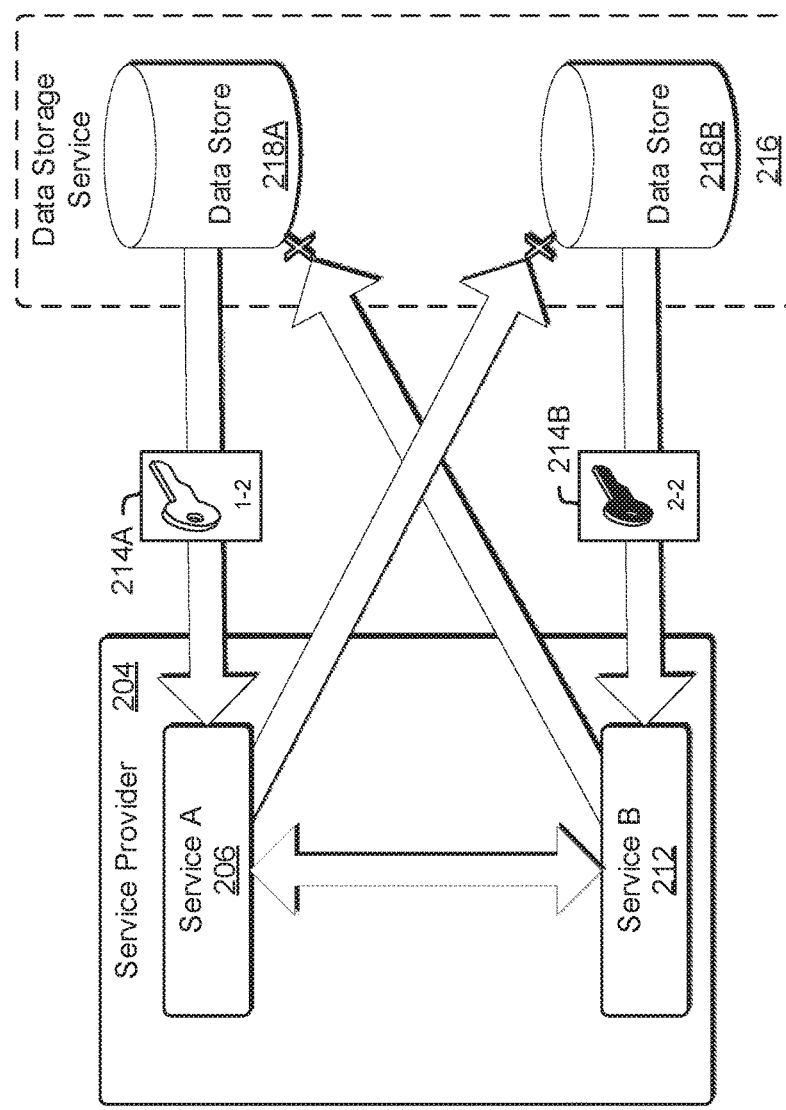
FIG. 2 illustrates an example of key isolation between services of a service provider in accordance with an embodiment.

FIG. 2 illustrates an example 200 of key isolation between services of a service provider, according to various embodiments. As illustrated in FIG. 2, the example 200 may include a service provider 204 comprising a service A 206 and a service B 212, which may both access a data storage service 216 comprising a first data store 218A and a second data store 218B. The service A 206 may have access to a private key 214A and not a public key 214B, and the service B 212 may have access to the public key 214B and not the private key 214A. In various embodiments, the service provider 204, the service A 206, and the service B 212 may be the same as or different from the service provider 104, the service A 106, and the service B 112, respectively, as described in connection with FIG. 1.

The data storage service 216 may be a collection of computing resources configured to process requests to store and/or access data. The data storage service 216 may allow data to be provided in responses to requests for the data and may operate using computing resources (e.g., databases) that enable the data storage service 216 to locate and retrieve data quickly. The data storage service 216 may include various data stores, such as the data stores 218A-218B, that may be utilized to store data. The first data store 218A and the second data store 218B may be databases, data stores, data structures, and/or variations thereof that may be configured to store data on behalf of the data storage service 216. In some examples, the data storage service 216 may provide data stores that may utilize various access policies; for example, the data storage service 216 may include a first data store accessible by a first entity and not a second entity, and a second data store accessible by the second entity and not the first entity.

For example, the data storage service 216 may be an on-demand data storage service comprising a collection of computing resources configured to synchronously process requests to store and/or access data. The on-demand data storage service 216 may allow data to be provided in responses to requests for the data and may operate using computing resources (e.g., databases) that enable the on-demand data storage service to locate and retrieve data quickly. For example, the on-demand data storage service may maintain stored data in a manner such that, when a request for a data object is retrieved, the data object can be provided (or streaming of the data object can be initiated) in a response to the request. Data stored in the on-demand data storage service may be organized into data objects. The data objects may have arbitrary sizes except, perhaps, for specified constraints on size. Thus, the on-demand data storage service may store numerous data objects of varying sizes. The on-demand data storage service may operate as a key value store that associates data objects with identifiers of the data objects which may be used by the service provider 204 to retrieve or perform other operations in connection with the data objects stored by the on-demand data storage service.

The service A 206 and the service B 212 may utilize an asymmetric cryptographic scheme. In various embodiments, an asymmetric cryptographic scheme refers to a cryptographic scheme that uses pairs of different keys to encrypt and decrypt data, in which a cryptographic key may be utilized to encrypt data and a different cryptographic key may be utilized to decrypt the data. Example algorithms utilized by asymmetric cryptographic schemes include but are not limited to those that utilize the Diffie-Hellman key protocol, the digital signature standard (DSS), the digital signature algorithm, the ElGamal algorithm, various elliptic curve algorithms, password-authenticated key techniques, the pallier cryptosystem, the RSA encryption algorithm (PKCS #1), the Cramer-Shoup cryptosystem, the YAK authenticated key protocol, the NTRUEncrypt cryptosystem, the McEliece cryptosystem, and others. Elliptic curve algorithms include the elliptic curve Diffie-Hellman (ECDH) key scheme, the Elliptic Curve Integrated Encryption Scheme (ECIES), the Elliptic Curve Digital Signature Algorithm (ECDSA), the ECMQV key scheme and the ECQV implicit certificate scheme. Other algorithms and combinations of algorithms are also considered as being within the scope of the present disclosure, and the above is not intended to be an exhaustive list.

The service A 206 may have access to the private key 214A, and the service B 212 may have access to the public key 214B. Conversely, the service B 212 may lack access to the private key 214A. In some embodiments, the service A 206 likewise lacks access to the public key 215B. The terms "public" and "private" may be used to distinguish between a cryptographic key held by service A 206 versus service B 212, but in implementation both cryptographic keys may be "private" in the sense that they are securely held and accessible only by the service to which they are assigned. The private key 214A and the public key 214B may be keys of an asymmetric cryptographic scheme. The private key 214A and the public key 214B may be cryptographic keys, cryptographic information, cryptographic secrets, and/or otherwise any information that may be utilized in various cryptographic operations, such as encryption and decryption. Although the techniques of the present disclosure are described as utilizing an asymmetric key scheme, it is contemplated that, in alternate implementations, a symmetric key scheme may be used (e.g., session key shared between the service A 206 and the service B 212).

In embodiments, the private key 214A is stored in the first data store 218A. In various embodiments, only the service A 206 has access to the private key 214A stored in the first data store 218A. Additionally or alternatively, in some examples, only the service B 212 may have access to the public key 214B stored the second data store 218B. The data storage service 216 may maintain various access policies that may restrict access to various data stores. The data storage service 216 may restrict access to the first data store 218A from the service B 212. The data storage service 216 may determine that credentials known only to the service A 206 are required to access the first data store 218A, thus excluding the service B 212 from access to the first data store 218A. The data storage service 216 may restrict access to the second data store 218B from the service A 206. The data storage service 216 may determine that credentials known only to the service B 212 are required to access the second data store 218B, thus excluding the service A 226 from access to the second data store 218B. In some examples, the private key 214A and the public key 214B may be fetched by the service A 206 and the service B 212, respectively, upon start or boot of the service A 206 and the service B 212. In an embodiment, the service A 206 and the service B 212 only store and utilize the cryptographic keys in volatile memory of the respective services, such that, upon power down or reboot, the cryptographic keys are not persisted; in this manner, malicious entities may be unable to misappropriate the cryptographic keys from local storages of the respective services.

The private key 214A may be associated with an encryption context within the first data store 218A. In some examples, "encryption context" refers to a set of key-value pairs that contains additional contextual information associated with the public-private keys. The additional contextual information may be cryptographically associated with the public-private keys such that the cryptographic operations utilizing the public-private keys must use the same encryption context. For example, if the encryption context provided in a decryption request to decrypt encrypted data does not match the encryption context used in the encryption of the encryption data, the decryption request may fail. The public key 214B may be associated with a different encryption context within the second data store 218B. In various embodiments, the encryption contexts are required to access the private key 214A and the public key 214B. The encryption contexts may be stored in various different data stores of the data storage service 216. In various embodiments, the private key 214A is encrypted with the encryption context, which may be stored in a different data store, within the first data store 218A. Additionally, the public key 214B may be encrypted with the different encryption context, which may be stored in a different data store, within the second data store 218B. For example, an entity may have access to the data store 218A, but the private key 214A stored in the data store 218A may be protected, encrypted, or otherwise secured with the encryption context such that the encryption context may be required in order to decrypt the private key 214A; without the encryption context the entity may not have access or be able to utilize the private key 214A, despite having access to the first data store 218A. Thus, the encryption context, which may be stored in a different data store or location, may need to be obtained to fully access, utilize, or obtain the private key 214A. In some embodiments, a key rotation scheme is utilized on the private key 214A and the public key 214B such that the private key 214A and the public key 214B may be periodically or sporadically changed.

Figure 3:
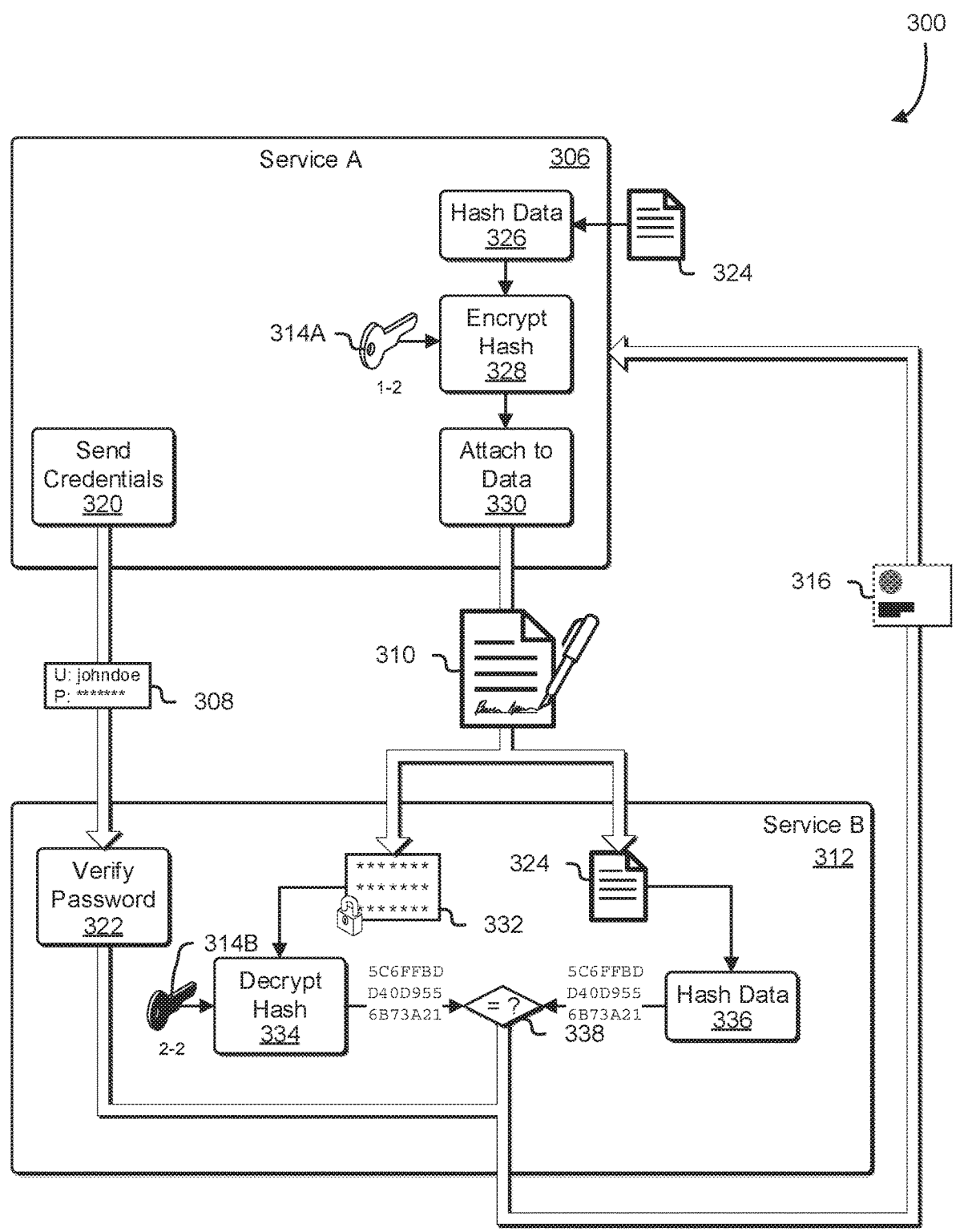
FIG. 3 illustrates a detailed example of service-to-service multi-factor authentication in accordance with an embodiment.

FIG. 3 illustrates an example 300 of service-to-service multi-factor authentication. As illustrated in FIG. 3, the example 300 may include a service A 306 and a service B 312. The service A 306 may be authenticated utilizing multi-factor authentication by the service B 312. In various embodiments, the service A 306 and the service B 312 are the same as or different from the service A 106 and the service B 112, respectively, as described in connection with FIG. 1.

The service A 306 may receive the data 324. In some examples, the data 324 may be received as part of a request.

The request may be a request for substitute sensitive data, and the data 324 may indicate various attributes and characteristics of the requested substitute sensitive data. The request may be provided by an entity that may seek to access a service of an interface provider that may require sensitive data. The entity may seek to utilize the requested substitute sensitive data to access the service of the interface provider.

In response to the request, the service A 306 may, in 320, send credential proof 308 to the service B 312. In various embodiments, the credential proof 308 is proof of (e.g., including a hash of a password and/or username) security credentials that may be utilized to authenticate the service A 306. The credential proof 308 may include a username and a hash of a password, in which other systems may compare to a known username and hash of a known password associated with the service A 306 to authenticate the service A 306. In various embodiments, the service A 306 only provides a hash of the password and not a plaintext version of the password. The service A 306 may only send a hash of the password generated through a hash function utilizing a plaintext version of the password as an input as part of the credential proof 308; the plaintext version of the password may not be sent as part of the credential proof 308.

The service B 312 may receive the credential proof 308, the encrypted hash 332, and the data 324. The service B 312 may, in 322, authenticate the credential proof 308. In some examples, the service B 312 may authenticate the credential proof 308 by comparing the credential proof 308 to known credentials of the service A 306. The service B 312 may utilize one or more databases that may include credential information of various services. The service B 312 may utilize the one or more databases to locate the username specified by the credential proof 308 and a corresponding password. The service B 312 may, utilizing the same hash function used to generate the hash of the password of the credential proof 308, generate a hash of the corresponding password. The service B 312 may compare the hash of the password of the credential proof 308 with the generated hash of the corresponding password; if hashes match, the service B 312 may determine that the credential proof 308 is authentic and authenticate the service A 306. If the hashes do not match, the service B 312 may determine that the credential proof 308 is invalid and the service A 306 cannot be authenticated.

The service A 306 may receive the data 324 with the request and, in further response to the request, in 326, hash the data 324. The service A 306 may utilize a hash function to generate a hash of the data 324. The service A 306 may have access to a private key 314A, and may access the private key 314A through various data storage services. The service B 312 may have access to a public key 314B, and may access the public key 314B through various data storage services. The private key 314A and the public key 314B may be cryptographic keys of an asymmetric cryptographic scheme. In some examples, the service A 306 may not have access to the public key 314B, and the service B 312 may not have access to the private key 314A. In 328, the hash of the data 324 may be encrypted utilizing the private key 314A. The hash may be encrypted or otherwise be digitally signed by the private key 314A. In 330, the encrypted hash may be attached to the data 324. The service A 306 may provide a digital signature 310 comprising the encrypted hash and the data 324 to the service B 312.

The service B 312 may then authenticate the digital signature 310. The service B 312 may authenticate or otherwise authenticate the digital signature of the service A 306. The service B 312 may first, in 334, decrypt the encrypted hash 332. The service B 312 may utilize the public key 314B to decrypt the encrypted hash 332. The service B 312 may then generate a hash of the received data 324. The service B 312 may, in 336, utilize the same hash function utilized in 326 by the service A 306 to hash the data 324. In 338, the service B 312 may then compare the decrypted encrypted hash 332 with the hash of the data 324 generated in 336; if the hashes match, the service B 312 may determine that the digital signature 310 is authentic and verified. The service B 312 may further determine that no modifications were made to the data 324 in transit to the service B 312. In various embodiments, if, in 338, the decrypted encrypted hash 332 does not match the hash of the data 324 generated in 336, the service B 312 may determine that the service A 306 is not authentic and cannot be authenticated, and provide a notification to the service A 306.

In this manner, the service B 312 may authenticate the service A 306 by authenticating the credential proof 308 and the digital signature 310. In some examples, the multi-factor authentication of the service A 306 by the service B 312 may fulfill the requirement of strong customer authentication (SCA) imposed by the European Union Revised Directive on Payment Services (PSD2). The service B 312 may then, upon determination that the service A 306 is authentic, provide the substitute sensitive data 316 to the service A 306. Note that, although the present disclosure describes service A 306 providing the credential proof and then providing the digital signature 310, it is contemplated that they may alternatively be provided in the opposite order, in parallel, or together.

Note that other embodiments are possible in which a third party or other service of the service provider may provide the substitute sensitive data 316 to the service A 306, as described in conjunction with FIG. 1. Likewise, in other embodiments the service B 312 may generate the substitute sensitive data 316 in accordance with specified conditions (e.g., conditions specified by the third party). In various embodiments, the service B 312 accesses various other systems and services, that may require proof of authentication of the service A 306, to retrieve the substitute sensitive data 316 to be provided to the service A 306. In such embodiments, the service B 312 authenticates the service A 306 utilizing multi-factor authentication in a similar manner as described in the present disclosure. As discussed above, a knowledge factor may be utilized such that the service B 312 may authenticate the service A 306 by authenticating known credentials of the service A 306. Additionally, as discussed above, a possession factor may be utilized such that the service B 312 may authenticate the service A 306, by authenticating the service A 306 has possession of the private key 314A by utilizing the corresponding public key 314B. In some examples, an inherence factor may be utilized such that service B 312 may authenticate the service A 306 by determining one or more characteristics that may be known to be inherent to the service A 306, and verifying that the service A 306 has the one or more characteristics to authenticate/verify the identity of the service A 306.

Figure 4:
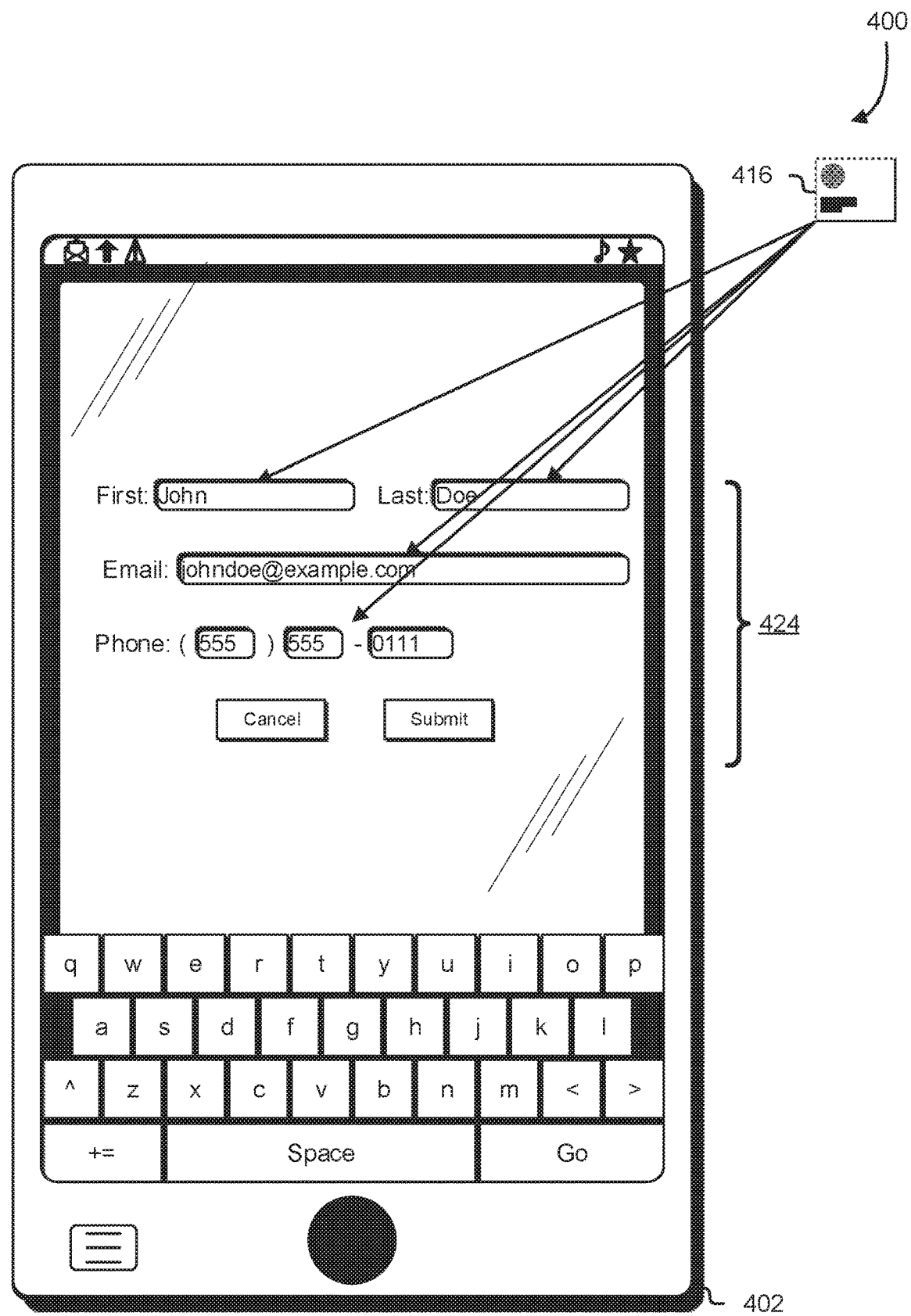
FIG. 4 illustrates an example of a device running an application in accordance with an embodiment.

FIG. 4 illustrates an example 400 of a device running an application, according to various embodiments. As illustrated in FIG. 4, the example 400 may include a client device 402, sensitive data input fields 424, and substitute sensitive data 416. In some examples, the client device 402 and the substitute sensitive data 416 may be the same as or different from the client device 102 and the substitute sensitive data 114, respectively, as described in connection with FIG. 1. In various embodiments, the client device 402 is configured to input sensitive data into the sensitive data input field 424, and, upon receipt of the sensitive data 416 from a service provider, the client device 402 may utilize the substitute sensitive data 416 as input to the sensitive data input fields 424.

The client device 402 may execute an application. The application may interface with various interface providers which may provide various services. The interface providers may provide interfaces (e.g., accessible via the Internet) that may be accessible by the client device 402 to submit requests for and/or interact with the services of the interface providers. As depicted in FIG. 4, the client device 402 may utilize the application to access an interface provided by an interface provider. The interface may include the sensitive data input fields 424 which may require sensitive data to be input in order to enable the client device 402 to access services provided by the interface provider. Examples of sensitive data may include data such as credential information, authentication information, security credentials, identifying information, and the like. The interface may require identifying information from the client device 402 to be input into the sensitive data input fields 424. In some examples, the user of the client device 402 may prefer to avoid inputting personally identifying information (PII) or other sensitive information specific to the user of the client device 402. The client device 402 may submit a request to a service, such as those described in connection with FIG. 1, to obtain the substitute sensitive data 416.

The service may perform various multi-factor authentication processes, such as those described in the present disclosure, to obtain the substitute sensitive data 416 and provide the substitute sensitive data 416 to the client device 402. The client device 402 may receive the substitute sensitive data 416, and utilize it as an input to the sensitive data input fields 424. The substitute sensitive data 416 may be utilized by the client device 402 as an input to the sensitive data input fields 424 such that the client device 402 may access the services of the interface provider without providing sensitive data specific to the client device 402. The substitute sensitive data 416 may satisfy the requirements of the sensitive data input fields 424 such that the interface provider may accept the substitute sensitive data 416 through the sensitive data input fields 424 and provide the client device 402 with access to the services provided by the interface provider.

For illustration, FIG. 4, the sensitive data input fields 424 are depicted as including a first name field, a last name field, an email address field, and a phone number field. The user of the client device 402 may prefer to avoid using his/her real information in some or all of the sensitive data input fields. Consequently, the application running on the client device 402 and displaying the interface may populate some or all of the sensitive data input fields with the substitute sensitive data 416. For example, some or all of the information (e.g., "John," "Doe," "johndoe@example.com," or "(555) 555-0111") may be specious data or data that belongs to another entity (e.g., the service provider 104 of FIG. 1) rather than the user of the client device 402. The substitute sensitive data 416 may be input into the sensitive data input fields 424 by the application running on the client device 402, causing the client device to simulate human interaction (e.g., clicking, tapping, entering keystrokes, etc.) with the interface.

Figure 5:
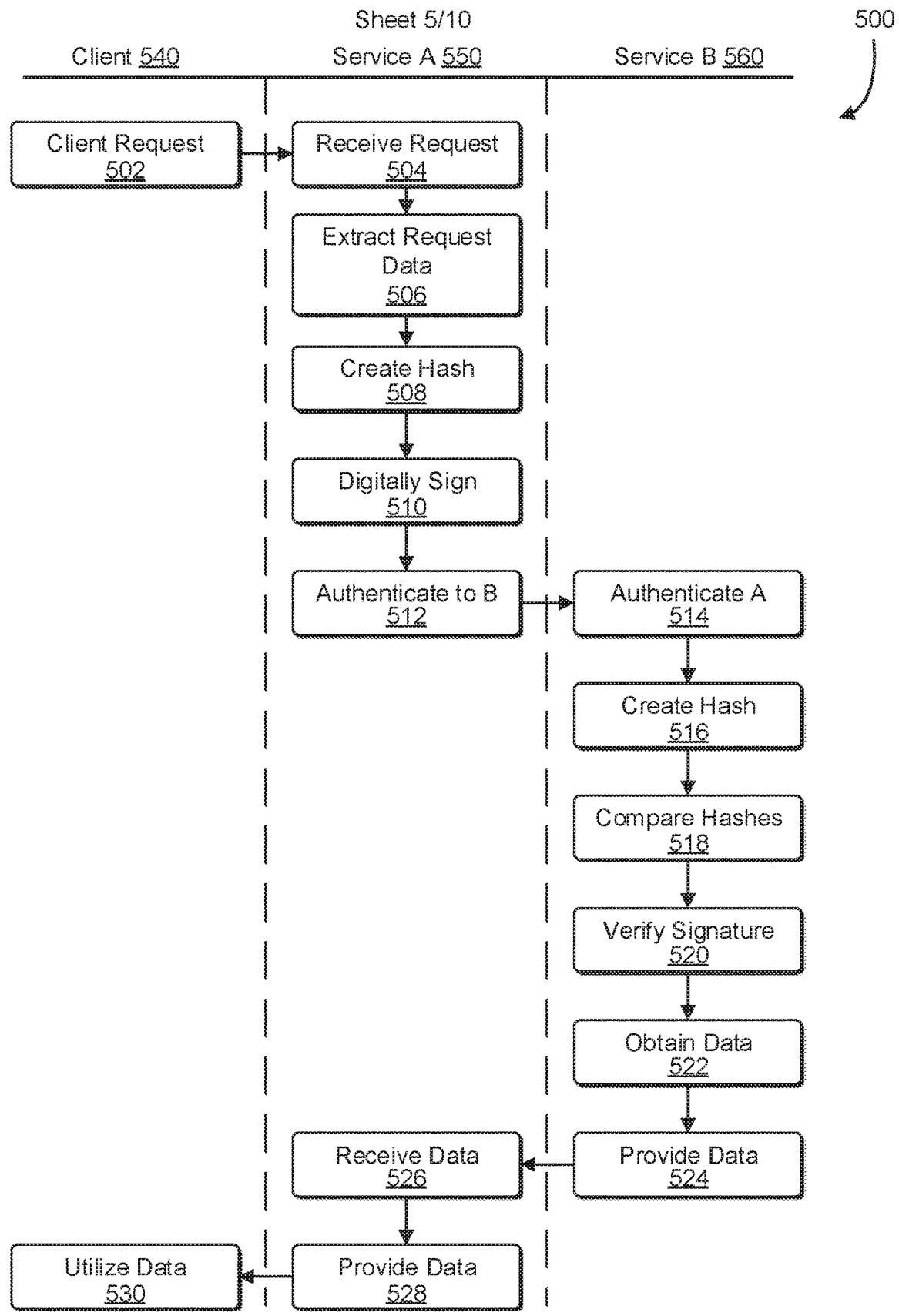
FIG. 5 is a swim diagram that illustrates an example of service-to-service multi-factor authentication in accordance with an embodiment.

FIG. 5 is a swim diagram illustrating an example of a process 500 for service-to-service multi-factor authentication, in accordance with various embodiments. Some or all of the process 500 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media). For example, some or all of process 500 may be performed by any suitable system, such as the computing device 1000 of FIG. 10. The process 500 may include a client 540, a service A 550, and a service B 560. In various embodiments, the client 540, the service A 550, and the service B 560 may be the same as or different from the client device 102, the service A 106, and the service B 112, respectively, as described in connection with FIG. 1.

The client 540 may be an entity similar to the client device 102 of FIG. 1 that is operable to access various systems and/or services, such as the service A 550 and the service B 560. The service A 550 and the service B 560 may be part of a service provider that may provide various services and data in response to requests. The service provider may utilize multi-factor authentication between the service A 550 and the service B 560 to provide the various services and data. The service A 550 and service B 560 may be similar to the service A 106 and service B 112 respectively.

In 502, the client 540 may submit a request to the service A 550. The client 540 may utilize one or more communication networks to submit the request. In some examples, the client 540 may submit the request through one or more interfaces provided by the service provider. Note, in some embodiments, the request 502 may be received from an entity different from the client 540, such as from another service of the service provider or from the interface provider 130 of FIG. 1. Additionally, in various examples, the client 540 may utilize an application provided by the service provider to submit the request. The request may be a request for substitute sensitive data that may be required by the client 540 to perform one or more processes in connection with various interface providers that may require sensitive data. The request may include data that may indicate various characteristics/attributes of the substitute sensitive data required, such as the type of substitute sensitive data required, the intended usage of the substitute sensitive data, identifiers of the interface providers that may require the substitute sensitive data, and/or variations thereof.

In 504, the service A 550 may receive the request. The service A 550 may, in 506, extract data from the request. The service A 550 may extract the data that may indicate various characteristics/attributes of the substitute sensitive data required. In 508, the service A 550 may create a hash based on the data. The service A 550 may create the hash by utilizing the data as an input, along with various other parameters, to a hash function which may generate the hash. In 510, the service A 550 may digitally sign the hash. In some examples, the service A 550 may digitally sign the hash utilizing a private cryptographic key, which may be part of an asymmetric cryptographic scheme in which the service B 560 may have exclusive access to a public cryptographic key and the service A 550 may have exclusive access to the private cryptographic key. The service A 550 may encrypt the hash utilizing the private cryptographic key.

In 512, the service A 550 may provide the encrypted hash, the data, as well as credential information to the service B 560 to be authenticated. The service B 560 may, in 514, authenticate the service A 550. The service B 560 may authenticate the credential information provided by the service A 550 to authenticate the service A 550. In some examples, the service A 550 may be associated with credentials such as a username and a password, and may provide the username and a hash of the password to the service B 560. The service B 560 may receive the username and the hash, and utilize one or more databases that may include known credential information to authenticate that the username and the hash are authentic and authenticate the service A 550.

In 516, the service B 560 may create a hash of the data received from the service A 550. The service B 560 may utilize the same hash function utilized by the service A 550 in 508 to generate the hash of the data. The service B 560 may then decrypt the received encrypted hash utilizing the public cryptographic key. The service B 560 may, in 518, compare the hashes. The service B 560 may compare the hash of the data with the decrypted received hash to, in 520, authenticate the digital signature. In some examples, if the hashes match, the service B 560 may determine that the digital signature is authentic. The service B 560 may authenticate that the digital signature has originated from the service A 550. The service B 560 may, in 522, obtain the substitute sensitive data that the client 540 requested. The service B 560 may interact with various other systems and/or services to obtain the substitute sensitive data. In some examples, the service B 560 may utilize the data from the request to obtain the substitute sensitive data.

The service B 560 may, in 524, provide the substitute sensitive data to the service A 550. Note that other embodiments are possible in which a third party or other service of the service provider may provide the substitute sensitive data to the service A 550, as described in conjunction with FIG. 1. Likewise, in other embodiments the service B 560 may generate the substitute sensitive data in accordance with specified conditions (e.g., conditions specified by the third party). In 526, the service A 550 may receive the data, and provide the data, in 528, to the client 540. The client 540 may, in 530, utilize the substitute sensitive data. The client 540 may utilize the substitute sensitive data to perform one or more processes in connection with various interface providers that may require sensitive data. Note that one or more of the operations performed in 502-30 may be performed in various orders and combinations, including in parallel.

Figure 6:
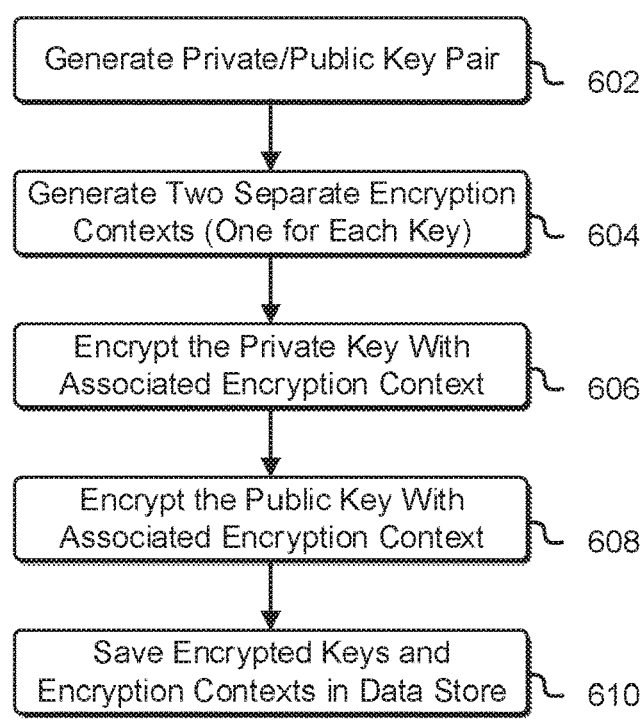
FIG. 6 is a flowchart that illustrates an example of pre-boot workflow in accordance with an embodiment.

FIG. 6 is a flowchart illustrating an example of a process 600 for generating and storing cryptographic keys in accordance with various embodiments. Some or all of the process 600 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media). For example, some or all of process 600 may be performed by any suitable system, such as the computing device 1000 of FIG. 10. In an embodiment, the process 600 includes a series of operations wherein cryptographic keys of an asymmetric cryptographic system utilized by various services are generated and stored. In various embodiments, the cryptographic keys are keys like those described in connection with FIG. 2.

In some examples, the process 600 may be performed prior to the operation, start, or boot of various services, such as the service A 106 and the service B 112 as described in connection with FIG. 1. In 602, the system performing the process 600 may generate a private/public key pair. In various embodiments, the private/public key pair is a set of cryptographic keys of an asymmetric cryptographic scheme. The system may generate the private/public key pair through one or more key derivation functions, which may utilize various inputs. In some examples, the system may randomly generate the private/public key pair. In some examples, the system may utilize a cryptographic service to generate the private/public key pair.

In 604, the system performing the process 600 may generate two separate encryption contexts, one for each cryptographic key. In various embodiments, an encryption context refers to contextual information that may indicate various aspects of data to be encrypted. The encryption context may include various data objects, and may include various cryptographic keys, values, indications, information, and the like. The encryption context may be utilized to encrypt and decrypt data. In some examples, when encrypting plaintext into ciphertext utilizing the encryption context, the encryption context may be cryptographically bound to the ciphertext such that the encryption context may be required to decrypt the ciphertext into plaintext. The system may generate an encryption context associated with the private key and an encryption context associated with the public key.

In 606, the system performing the process 600 may encrypt the private key with the encryption context associated with the private key. The system may encrypt the private key utilizing the associated encryption context such that the associated encryption context may be required to decrypt the private key. In various embodiments, the system encrypts the private key utilizing one or more cryptographic keys provided by the cryptographic service along with the associated encryption context. In some embodiments, the system encrypts the private key utilizing the associated encryption context.

In 608, the system performing the process 600 may encrypt the public key with the encryption context associated with the public key. The system may encrypt the public key utilizing the associated encryption context such that the associated encryption context may be required to decrypt the public key. In various embodiments, the system encrypts the public key utilizing one or more cryptographic keys provided by the cryptographic service along with the associated encryption context. In some embodiments, the system encrypts the public key utilizing the associated encryption context.

In 610, the system performing the process 600 may save the encrypted keys and the associated encryption contexts in a data store. In various embodiments, the system utilizes a data store that may be associated with the cryptographic service. The system may store the encrypted keys and the associated encryption contexts in various locations within the data store. In some examples, the system may store the encrypted keys such that access to the encrypted keys may not enable access to the associated encryption contexts. The system may store the encrypted keys in a partition within the data store, and the associated encryption contexts in a different partition within the data store. In various examples, the partitions within the data store may be cryptographically protected, and access to a particular partition within the data store may not enable access to a different partition within the data store. Note that one or more of the operations performed in 602-10 may be performed in various orders and combinations, including in parallel.

Figure 7:
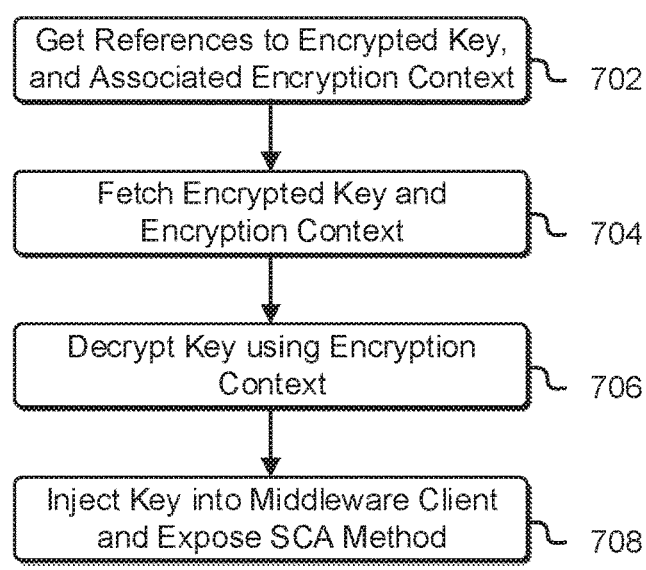
FIG. 7 is a flowchart that illustrates an example of an on-boot workflow in accordance with an embodiment.

FIG. 7 is a flowchart illustrating an example of a process 700 for fetching cryptographic keys, in accordance with various embodiments. Some or all of the process 700 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media). For example, some or all of process 700 may be performed by any suitable system, such as the computing device 1000 of FIG. 10. In an embodiment, the process 700 includes a series of operations wherein an encrypted key is fetched and decrypted.

In various embodiments, the process 700 is performed during the operation, boot, or start of various services, such as the service A 106 and the service B 112 as described in connection with FIG. 1. The process 700 may be utilized to obtain cryptographic keys of an asymmetric cryptographic scheme. In 702, the system performing the process 700 may get references to an encrypted key and associated encryption context. In some examples, a public/private key pair may be encrypted utilizing associated encryption contexts and stored within a data store. Further information regarding the encryption and storage of the public/private key pair can be found in the description of FIG. 6. The locations of the encrypted key and associated encryption context may be provided to the system. The references may indicate where the encrypted key and the associated encryption context are stored within the data store.

In 704, the system performing the process 700 may fetch the encrypted key and the encryption context. The system may submit a request to the data store to fetch the encrypted key and the encrypted context, which may be stored in separate locations. The request may include the references to the encrypted key and the associated encryption context. The data store, in response to the request, may provide the encrypted key and the encryption context to the system.

In 706, the system performing the process 700 may decrypt the encrypted key using the encryption context. The system may input the encrypted key into a cryptographic algorithm with the encryption context to decrypt the encrypted key. In some examples, the system may retrieve other cryptographic keys from the data store, or other various cryptographic services, and utilize the cryptographic keys along with the encryption context to decrypt the encrypted key.

In 708, the system performing the process 700 may inject the decrypted key into a middleware client and expose an SCA method. The system may inject the cryptographic key into various services that may require an SCA method for authentication. For example, the system may perform processes 702-06 for a private key and a public key which may have been encrypted and stored. Continuing with the example, the system may inject the private key and the public key into a service provider; the service provider may comprise two services, service A and service B, which may utilize the private key and the public key. Further continuing with the example, the service A may utilize the private key and the service B may utilize the public key, and the service B may authenticate the service A utilizing the cryptographic keys, as well as at least one other multi-factor authentication factor, as part of an SCA method. Note that one or more of the operations performed in 702-08 may be performed in various orders and combinations, including in parallel.

Figure 8:
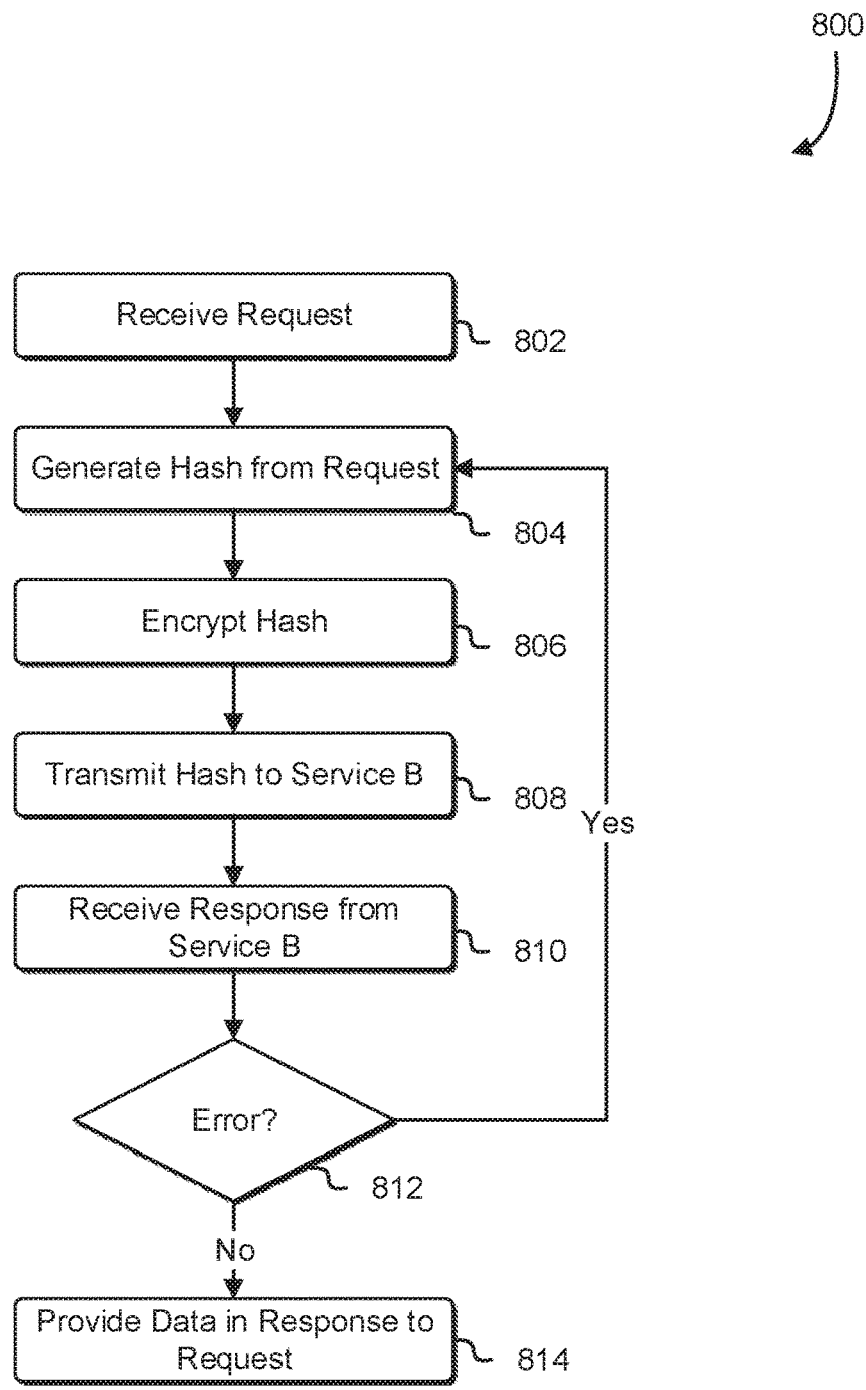
FIG. 8 is a flowchart that illustrates an example of an authenticating service performing service-to-service multi-factor authentication in accordance with an embodiment.

FIG. 8 is a flowchart illustrating an example of a process 800 for an authenticating service (e.g., service A 106 of FIG. 1) performing service-to-service multi-factor authentication with an authentication service (e.g., service B 112), in accordance with various embodiments. Some or all of the process 800 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media). For example, some or all of process 800 may be performed by any suitable system, such as the computing device 1000 of FIG. 10. The process 800 includes a series of operations wherein a service may receive a request and be authenticated by another service.

In 802, the system performing the process 800 may receive a request. The request may be received from an entity that may seek to access a service which may require sensitive data. The request may be a request for substitute sensitive data which the entity may utilize to access the service. In various embodiments, the substitute sensitive data is data such as credential information. In some examples, the request may include data that may indicate various attributes about the sought substitute sensitive data. The attributes may include information such as the type of substitute sensitive data required, information regarding the service, and/or variations thereof.

In 804, the system performing the process 800 may obtain the data from the request and generate a hash from the data included in the request. The system may utilize one or more hash functions, which may utilize the data, as well as various other parameters, as inputs, to generate the hash. In 806, the system performing the process 800 may encrypt the hash. The system may digitally sign the hash. The system may utilize various cryptographic algorithms and ciphers that may utilize various cryptographic keys to encrypt the hash. In various embodiments, the system is a first service, which may be referred to as service A, that may be part of an asymmetric cryptographic system that may include a second service, that may be referred to as service B. In some examples, the service A may have access to a private cryptographic key, and the service B may have access to a public cryptographic key, in which the private cryptographic key and the public cryptographic key may be an asymmetric key pair. The system may encrypt the hash utilizing the private cryptographic key.

In 808, the system performing the process 800 may transmit the hash to the service B. In some examples, the system may transmit the hash, the encrypted hash, and the data from the request to the service B. The system may also transmit credential information associated with the system. The service B may perform various responses in connection with the received hash, the encrypted hash, and the data from the request. The service B may perform a multi-factor authentication of the system. The service B may authenticate the credential information. The service B may utilize the public cryptographic key to authenticate the digital signature of the service A. The service B may then provide a response to the system indicating the results of the multi-factor authentication.

In 810, the system performing the process 800 may receive the response from the service B. The system may, in 812, determine if the multi-factor authentication of the system by the service B had errors (e.g., a hashes of the data, password, or signature do not match). If so, the system may return to 804 to re-attempt the multi-factor authentication of the system. Errors may indicate that data corruption occurred, that service A 106 of FIG. 1 has obsolete credential or key information, or that data has been tampered with.

On the other hand, if the multi-factor authentication of the system is successful, the system may, in 814, provide data in response to the request. The system may provide the sought substitute sensitive data in response to the request. In various embodiments, the system may, upon successful multi-factor authentication of the system by the service B, receive the substitute sensitive data from the service B, and provide the substitute sensitive data in response to the request. The entity may receive the substitute sensitive data, and utilize the substitute sensitive data to access the service. Note that one or more of the operations performed in 802-14 may be performed in various orders and combinations, including in parallel.

Figure 9:
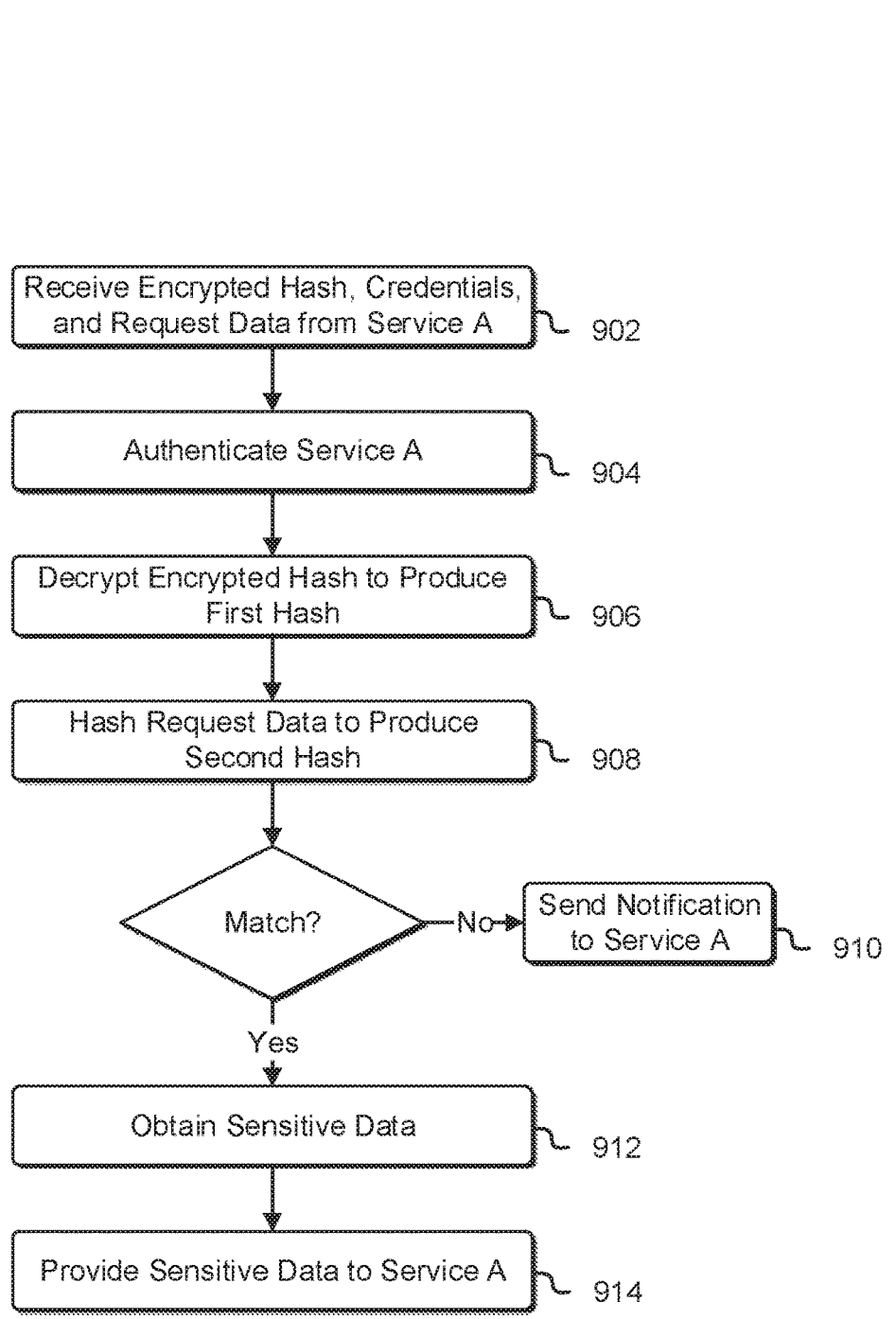
FIG. 9 is a flowchart that illustrates an example of an authentication service authenticating another service in accordance with an embodiment.

FIG. 9 is a flowchart illustrating an example of a process 900 for an authentication service (e.g., service B 112 of FIG. 1) authenticating another service (e.g., service A 106), in accordance with various embodiments. Some or all of the process 900 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media). For example, some or all of process 900 may be performed by any suitable system, such as the computing device 1000 of FIG. 10. The process 900 includes a series of operations wherein a service may authenticate another service. In various embodiments, the process 900 is performed by a service such as the service B as described in connection with FIG. 8.

In 902, the system performing the process 900 may receive an encrypted hash, credential proof, and request data from a service A. In various embodiments, the service A receives a request for substitute sensitive data. The request may indicate various attributes regarding the substitute sensitive data. The service A may have generated a hash from the request data utilizing a particular hash function, and encrypted the hash utilizing a private cryptographic key of an asymmetric cryptographic system, which the system may be part of, and may have access to a corresponding public cryptographic key. The credential proof may be proof of identity of the service A that may be utilized to authenticate the service A. Further information regarding the encrypted hash, credential proof, and request data can be found in the description of FIG. 3.

In 904, the system performing the process 900 may authenticate the service A. The system may authenticate the credential proof received from the service A. The system may compare the received credential proof with known credentials of the service A to authenticate the service A. In some examples, the received credential proof may include a username and a hash of a corresponding password generated from a specific hash function. The system may utilize a database that includes known credential information. The system may locate the username and the corresponding password; the system may generate a hash of the located corresponding password utilizing the specific hash function, and compare it with the hash from the received credential proof to authenticate the service A.

In 906, the system performing the process 900 may decrypt the encrypted hash to produce a first hash. In various embodiments, the system utilizes the public cryptographic key to decrypt the encrypted hash. The system may utilize various cryptographic algorithms/ciphers along with the public cryptographic key to decrypt the encrypted hash to produce the first hash. In 908, the system performing the process 900 may hash the request data to produce a second hash. The system may utilize the particular hash function utilized by the service A to hash the request data.

The system performing the process 900 may compare the second hash to the first hash. The system may verify the integrity of the first hash. If the hashes do not match, the system may, in 910, send a notification to the service A. The notification may indicate that multi-factor authentication has failed and the system is unable to verify the integrity of the first hash. The notification may further indicate that the service A may re-attempt the multi-factor authentication by providing a new set of an encrypted hash, credential proof, and request data. If the hashes do match, the system may, in 912, obtain the substitute sensitive data. The system may obtain the substitute sensitive data from various third parties that may provide data in response to requests. The request data may indicate various attributes of the sought substitute sensitive data; the system may utilize the request data to obtain the substitute sensitive data. The system may then, in 914, provide the substitute sensitive data to the service A. Note that other embodiments are possible in which a third party or other service of the service provider may provide the substitute sensitive data 316 to the service A 306, as described in conjunction with FIG. 1. Likewise, in other embodiments the service B 560 may generate the substitute sensitive data in accordance with specified conditions (e.g., conditions specified by the third party). Note also that one or more of the operations performed in 902-14 may be performed in various orders and combinations, including in parallel.

Note that, in the context of describing disclosed embodiments, unless otherwise specified, use of expressions regarding executable instructions (also referred to as code, applications, agents, etc.) performing operations that "instructions" do not ordinarily perform unaided (e.g., transmission of data, calculations, etc.) denotes that the instructions are being executed by a machine, thereby causing the machine to perform the specified operations.

Figure 10:
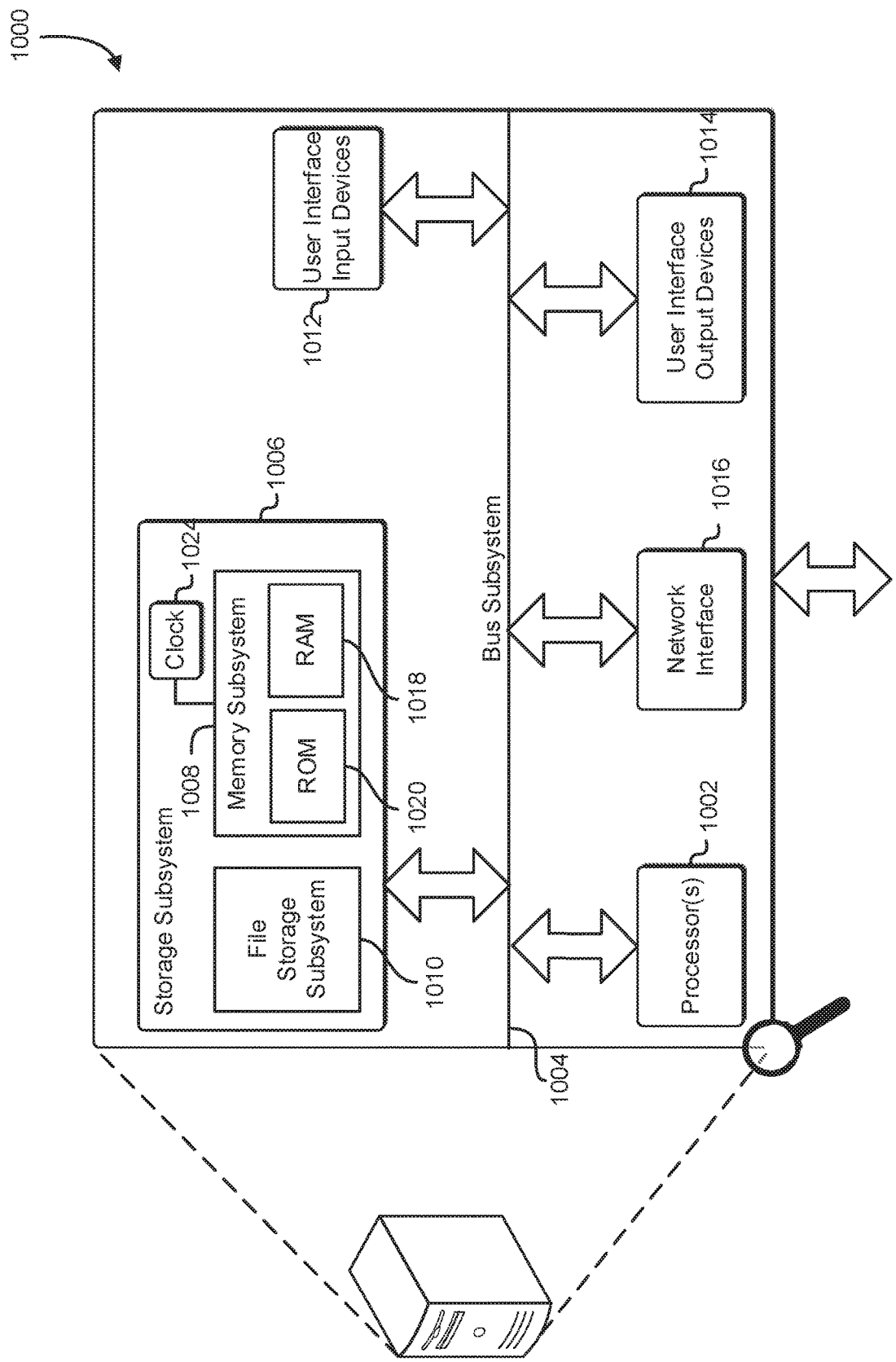
FIG. 10 illustrates a computing device that may be used in accordance with at least one embodiment/an environment in which various embodiments can be implemented.

FIG. 10 is an illustrative, simplified block diagram of a computing device 1000 that can be used to practice at least one embodiment of the present disclosure. In various embodiments, the computing device 1000 includes any appropriate device operable to send and/or receive requests, messages, or information over an appropriate network and convey information back to a user of the device. The computing device 1000 may be used to implement any of the systems illustrated and described above. For example, the computing device 1000 may be configured for use as a data server, a web server, a portable computing device, a personal computer, a cellular or other mobile phone, a handheld messaging device, a laptop computer, a tablet computer, a set-top box, a personal data assistant, an embedded computer system, an electronic book, or any electronic computing device. The computing device 1000 may be implemented as a hardware device, a virtual computer system, or one or more programming modules executed on a computer system, and/or as another device configured with hardware and/or software to receive and respond to communications (e.g., web service application programming interface (API) requests) over a network.

As shown in FIG. 10, the computing device 1000 may include one or more processors 1002 that, in embodiments, communicate with and are operatively coupled to a number of peripheral subsystems via a bus subsystem. In some embodiments, these peripheral subsystems include a storage subsystem 1006, comprising a memory subsystem 1008 and a file/disk storage subsystem 1010, one or more user interface input devices 1012, one or more user interface output devices 1014, and a network interface subsystem 1016. Such storage subsystem 1006 may be used for temporary or long-term storage of information.

In some embodiments, the bus subsystem 1004 provides a mechanism for enabling the various components and subsystems of computing device 1000 to communicate with each other as intended. Although the bus subsystem 1004 is shown schematically as a single bus, alternative embodiments of the bus subsystem utilize multiple buses. The network interface subsystem 1016 may provide an interface to other computing devices and networks. The network interface subsystem 1016 may serve as an interface for receiving data from and transmitting data to other systems from the computing device 1000. In some embodiments, the bus subsystem 1004 is utilized for communicating data such as details, search terms, and so on. In an embodiment, the network interface subsystem 1016 communicates via any appropriate network that would be familiar to those skilled in the art for supporting communications using any of a variety of commercially available protocols, such as Transmission Control Protocol/Internet Protocol (TCP/IP), User Datagram Protocol (UDP), protocols operating in various layers of the Open System Interconnection (OSI) model, File Transfer Protocol (FTP), Universal Plug and Play (UpnP), Network File System (NFS), Common Internet File System (CIFS), and other protocols.

The network, in an embodiment, is a local area network, a wide-area network, a virtual private network, the Internet, an intranet, an extranet, a public switched telephone network, a cellular network, an infrared network, a wireless network, a satellite network, or any other such network and/or combination thereof, and components used for such a system may depend at least in part upon the type of network and/or system selected. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode (ATM) and Frame Relay are unreliable connection-oriented protocols. Connection-oriented protocols are in contrast to packet-oriented protocols such as UDP that transmit packets without a guaranteed ordering. Many protocols and components for communicating via such a network are well known and will not be discussed in detail. In an embodiment, communication via the network interface subsystem 1016 is enabled by wired and/or wireless connections and combinations thereof.

In some embodiments, the user interface input devices 1012 includes one or more user input devices such as a keyboard; pointing devices such as an integrated mouse, trackball, touchpad, or graphics tablet; a scanner; a code scanner; a touch screen incorporated into the display; audio input devices such as voice recognition systems, microphones; and other types of input devices. In general, use of the term "input device" is intended to include all possible types of devices and mechanisms for inputting information to the computing device 1000. In some embodiments, the one or more user interface output devices 1014 include a display subsystem, a printer, or non-visual displays such as audio output devices, etc. In some embodiments, the display subsystem includes a cathode ray tube (CRT), a flat-panel device such as a liquid crystal display (LCD), light emitting diode (LED) display, or a projection or other display device. In general, use of the term "output device" is intended to include all possible types of devices and mechanisms for outputting information from the computing device 1000. The one or more user interface output devices 1014 can be used, for example, to present user interfaces to facilitate user interaction with applications performing processes described and variations therein, when such interaction may be appropriate.

In some embodiments, the storage subsystem 1006 provides a computer-readable storage medium for storing the basic programming and data constructs that provide the functionality of at least one embodiment of the present disclosure. The applications (programs, code modules, instructions), when executed by one or more processors in some embodiments, provide the functionality of one or more embodiments of the present disclosure and, in embodiments, are stored in the storage subsystem 1006. These application modules or instructions can be executed by the one or more processors 1002. In various embodiments, the storage subsystem 1006 additionally provides a repository for storing data used in accordance with the present disclosure. In some embodiments, the storage subsystem 1006 includes a memory subsystem 1008 and a file/disk storage subsystem 1010.

In embodiments, the memory subsystem 1008 includes a number of memories, such as a main random access memory (RAM) 1018 for storage of instructions and data during program execution and/or a read only memory (ROM) 1020, in which fixed instructions can be stored. In some embodiments, the file/disk storage subsystem 1010 provides a non-transitory persistent (non-volatile) storage for program and data files and can include a hard disk drive, a floppy disk drive along with associated removable media, a Compact Disk Read Only Memory (CD-ROM) drive, an optical drive, removable media cartridges, or other like storage media.

In some embodiments, the computing device 1000 includes at least one local clock 1024. The at least one local clock 1024, in some embodiments, is a counter that represents the number of ticks that have transpired from a particular starting date and, in some embodiments, is located integrally within the computing device 1000. In various embodiments, the at least one local clock 1024 is used to synchronize data transfers in the processors for the computing device 1000 and the subsystems included therein at specific clock pulses and can be used to coordinate synchronous operations between the computing device 1000 and other systems in a data center. In another embodiment, the local clock is a programmable interval timer.

The computing device 1000 could be of any of a variety of types, including a portable computer device, tablet computer, a workstation, or any other device described below. Additionally, the computing device 1000 can include another device that, in some embodiments, can be connected to the computing device 1000 through one or more ports (e.g., USB, a headphone jack, Lightning connector, etc.). In embodiments, such a device includes a port that accepts a fiber-optic connector. Accordingly, in some embodiments, this device converts optical signals to electrical signals that are transmitted through the port connecting the device to the computing device 1000 for processing. Due to the everchanging nature of computers and networks, the description of the computing device 1000 depicted in FIG. 10 is intended only as a specific example for purposes of illustrating the preferred embodiment of the device. Many other configurations having more or fewer components than the system depicted in FIG. 10 are possible.

The specification and drawings are, accordingly, to be regarded in an illustrative rather than a restrictive sense. However, it will be evident that various modifications and changes may be made thereunto without departing from the scope of the invention as set forth in the claims. Likewise, other variations are within the scope of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions and equivalents falling within the scope of the invention, as defined in the appended claims.

In some embodiments, data may be stored in a data store (not depicted). In some examples, a "data store" refers to any device or combination of devices capable of storing, accessing, and retrieving data, which may include any combination and number of data servers, databases, data storage devices, and data storage media, in any standard, distributed, virtual, or clustered system. A data store, in an embodiment, communicates with block-level and/or object level interfaces. The computing device 1000 may include any appropriate hardware, software and firmware for integrating with a data store as needed to execute aspects of one or more applications for the computing device 1000 to handle some or all of the data access and logic for the one or more applications. The data store, in an embodiment, includes several separate data tables, databases, data documents, dynamic data storage schemes, and/or other data storage mechanisms and media for storing data relating to a particular aspect of the present disclosure. In an embodiment, the computing device 1000 includes a variety of data stores and other memory and storage media as discussed above. These can reside in a variety of locations, such as on a storage medium local to (and/or resident in) one or more of the computers or remote from any or all of the computers across a network. In an embodiment, the information resides in a storage-area network (SAN) familiar to those skilled in the art, and, similarly, any necessary files for performing the functions attributed to the computers, servers or other network devices are stored locally and/or remotely, as appropriate.

In an embodiment, the computing device 1000 may provide access to content including, but not limited to, text, graphics, audio, video, and/or other content that is provided to a user in the form of HyperText Markup Language (HTML), Extensible Markup Language (XML), JavaScript, Cascading Style Sheets (CSS), JavaScript Object Notation (JSON), and/or another appropriate language. The computing device 1000 may provide the content in one or more forms including, but not limited to, forms that are perceptible to the user audibly, visually, and/or through other senses. The handling of requests and responses, as well as the delivery of content, in an embodiment, is handled by the computing device 1000 using PHP: Hypertext Preprocessor (PHP), Python, Ruby, Perl, Java, HTML, XML, JSON, and/or another appropriate language in this example. In an embodiment, operations described as being performed by a single device are performed collectively by multiple devices that form a distributed and/or virtual system.

In an embodiment, the computing device 1000 typically will include an operating system that provides executable program instructions for the general administration and operation of the computing device 1000 and includes a computer-readable storage medium (e.g., a hard disk, random access memory (RAM), read only memory (ROM), etc.) storing instructions that if executed (e.g., as a result of being executed) by a processor of the computing device 1000 cause or otherwise allow the computing device 1000 to perform its intended functions (e.g., the functions are performed as a result of one or more processors of the computing device 1000 executing instructions stored on a computer-readable storage medium).

In an embodiment, the computing device 1000 operates as a web server that runs one or more of a variety of server or mid-tier applications, including Hypertext Transfer Protocol (HTTP) servers, FTP servers, Common Gateway Interface (CGI) servers, data servers, Java servers, Apache servers, and application servers. In an embodiment, computing device 1000 is also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python, or TCL, as well as combinations thereof. In an embodiment, the computing device 1000 is capable of storing, retrieving, and accessing structured or unstructured data. In an embodiment, computing device 1000 additionally or alternatively implements a database, such as one of those commercially available from Oracle®, Microsoft®, Sybase®, and IBM® as well as open-source servers such as MySQL, Postgres, SQLite, MongoDB. In an embodiment, the database includes table-based servers, document-based servers, unstructured servers, relational servers, non-relational servers, or combinations of these and/or other database servers.

The use of the terms "a" and "an" and "the" and similar referents in the context of describing the disclosed embodiments (especially in the context of the following claims) is to be construed to cover both the singular and the plural, unless otherwise indicated or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values in the present disclosure are merely intended to serve as a shorthand method of referring individually to each separate value falling within the range unless otherwise indicated and each separate value is incorporated into the specification as if it were individually recited. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., could be either A or B or C, or any nonempty subset of the set of A and B and C. For instance, in the illustrative example of a set having three members, the conjunctive phrases "at least one of A, B, and C" and "at least one of A, B, and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described can be performed in any suitable order unless otherwise indicated or otherwise clearly contradicted by context. Processes described (or variations and/or combinations thereof) can be performed under the control of one or more computer systems configured with executable instructions and can be implemented as code (e.g., executable instructions, one or more computer programs or one or more applications) executing collectively on one or more processors, by hardware or combinations thereof. In some embodiments, the code can be stored on a computer-readable storage medium, for example, in the form of a computer program comprising a plurality of instructions executable by one or more processors. In some embodiments, the computer-readable storage medium is non-transitory.

The use of any and all examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments will become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety.

What is claimed is:

1. A computer-implemented method, comprising:
   receiving, at a first service of a service provider, a request for substitute sensitive data of the service provider, the request including a set of attributes, granting of access to the substitute sensitive data being contingent upon successful multi-factor authentication of the first service, the set of attributes identifying at least:
      a user associated with a client device; and
      an interface provider associated with an interface displayed by the client device;
   generating, by the first service using a private key of an asymmetric key pair, a digital signature based on the set of attributes, a second service of the service provider lacking access to the private key;
   providing, to the second service by the first service, proof of credentials associated with the first service and the digital signature;
   performing, by the second service, the multi-factor authentication of the first service by at least:
      authenticating the proof of credentials as a first factor of the multi-factor authentication; and
      authenticating, using a public key of the asymmetric key pair, the digital signature as a second factor of the multi-factor authentication;
   granting, by the second service to the first service, access to the substitute sensitive data;
   storing, in a data store, metadata that associates the substitute sensitive data with the user and the interface provider; and
   causing, by providing the substitute sensitive data to the client device, the client device to:
      enter the substitute sensitive data into the interface in place of sensitive data associated with the user; and
      cause, by submission of the substitute sensitive data to the interface provider, the interface provider to perform an operation using the substitute sensitive data.

2. The computer-implemented method of claim 1, further comprising:
   generating, by the first service, a hash of at least a subset of the set of attributes;
   providing, to the second service by the first service, the hash; and
   authenticating, by the second service, authenticity of the subset of attributes by validating the hash.

3. The computer-implemented method of claim 1, further comprising obtaining, by the second service, the substitute sensitive data in accordance with a set of conditions specified by a third party entity.

4. The computer-implemented method of claim 1, wherein the request is received from the client device.

5. A system, comprising:
   one or more processors; and
   memory including executable instructions that, if executed by the one or more processors, cause the system to implement:
      a first service that:
         receives a request from a computing device for substitute data, wherein access to the substitute data is contingent upon successful multi-factor authentication of the first service;
         generates, using a first key of public-private key pair, signature data based on the request;
         provides, to a second service, credential proof and the signature data;
         obtains the substitute data as a result of authentication by the second service; and
         causes, by providing the substitute data to the computing device, the computing device to input the substitute data into an interface in place of data associated with an entity that provided the request; and
      a second service that:
         verifies the credential proof as a first factor of the multi-factor authentication;
         verifies, using a second key, the signature data as a second factor of the multi-factor authentication; and
         provides the substitute data to the first service.

6. The system of claim 5, wherein the executable instructions further include instructions that cause the system to implement the second service to obtain the substitute data such that the substitute data conforms to an arrangement with a third party service.

7. The system of claim 5, wherein the second service lacks access to the first key.

8. The system of claim 5, wherein the executable instructions that further include instructions that cause the system to:
implement the first service to:
generate a hash of information included with the request; and
provide the hash of information to the second service; and
implement the second service to verify the hash of information.

9. The system of claim 5, wherein the computing device is associated with an entity outside the control of a provider of the system.

10. The system of claim 5, wherein the substitute data is data that is usable in place of sensitive data associated with a user of the computing device.

11. The system of claim 5, wherein:
the executable instructions that cause the system to implement the first service further include instructions that further cause the system to cause the first service to:
generate a hash of information included in the request; and
provide, to the second service by the first service, the hash; and
the executable instructions that cause the system to implement the second service further include instructions that further cause the system to implement the second service to verify integrity of the hash.

12. The system of claim 5, wherein the substitute data is associated with a set of conditions restricting usage of the substitute data.

13. A set of one or more non-transitory computer-readable storage media that stores executable instructions that, as a result of being executed by one or more processors of a computer system, cause the computer system to:
receive, at a first service of a service provider, a request from a user via a computing device for substitute data, wherein access to the substitute data is contingent upon successful multi-factor authentication of the first service;
generate, by the first service using a first key of public-private key pair, signature data;
provide, to a second service of the service provider by the first service, credential proof associated with the first service and the signature data, the second service lacking access to the first key;
authenticate, by the second service, the credential proof as a first factor of the multi-factor authentication;
authenticate, by the second service using a second key, the signature data as a second factor of the multi-factor authentication; and
cause, by providing the computing device with access to the substitute data to the computing device, the computing device to submit, to an interface provider, the substitute data via an interface of the computing device in place of data associated with the user.

14. The set of one or more non-transitory computer readable storage media of claim 13, wherein the executable instructions further include instructions that further cause the computer system to, as a result of authenticating the credential proof and the signature data, grant to the first service access to the substitute data.

15. The set of one or more non-transitory computer readable storage media of claim 13, wherein the executable instructions further include instructions that further cause the computer system to store, in a data store, an association between the user and the substitute data.

16. The set of one or more non-transitory computer readable storage media of claim 13, wherein the executable instructions that cause the computer system to cause the computing device to submit the substitute data further cause the computing device to cause, by submission of the substitute data, to perform an operation using the substitute data.

17. The set of one or more non-transitory computer readable storage media of claim 13, wherein the executable instructions further include instructions that further cause the computer system to, as a result of authenticating the credential proof and the signature data, obtain the substitute data from a third party entity.

18. The set of one or more non-transitory computer readable storage media of claim 13, wherein the executable instructions further include instructions that cause the computer system to:
generate, by the first service, a hash of information included in the request;
provide, to the second service by the first service, the hash; and
verify, by the second service, integrity of the hash.

19. The set of one or more non-transitory computer readable storage media of claim 18, wherein the information identifies one or more of:
the user,
the interface provider, or
a value of an item displayed in the interface.

20. The set of one or more non-transitory computer readable storage media of claim 18, wherein the executable instructions that cause the computer system to generate the signature data further include instructions that further cause the computer system to generate the signature data based on the information.

* * * * *